(12) United States Patent
Nasirian et al.

(10) Patent No.: US 10,809,678 B2
(45) Date of Patent: Oct. 20, 2020

(54) SYSTEM AND METHOD FOR DISTRIBUTED CONTROL OF AN ELECTRICAL NETWORK

(71) Applicants: Vahidreza Nasirian, Houston, TX (US); Ali Davoudi, Arlington, TX (US); Frank L. Lewis, Arlington, TX (US)

(72) Inventors: Vahidreza Nasirian, Houston, TX (US); Ali Davoudi, Arlington, TX (US); Frank L. Lewis, Arlington, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 449 days.

(21) Appl. No.: 15/070,611

(22) Filed: Mar. 15, 2016

(65) Prior Publication Data

US 2016/0276830 A1 Sep. 22, 2016

Related U.S. Application Data

(60) Provisional application No. 62/133,974, filed on Mar. 16, 2015.

(51) Int. Cl.
*G05B 15/02* (2006.01)
*H04W 4/50* (2018.01)
(Continued)

(52) U.S. Cl.
CPC .............. *G05B 15/02* (2013.01); *H02J 3/18* (2013.01); *H02J 13/00001* (2020.01);
(Continued)

(58) Field of Classification Search
CPC ... G05B 15/02; H02J 3/18; H02J 3/001; H02J 3/0079; H02J 2003/007; H04L 45/22;
(Continued)

(56) References Cited

U.S. PATENT DOCUMENTS

| 4,320,306 A * | 3/1982 | Kohga | ..... H02P 9/14 307/20 |
| 6,735,704 B1 * | 5/2004 | Butka | ..... H02J 1/10 307/86 |

(Continued)

OTHER PUBLICATIONS

Ali Bidram, "Distributed Cooperative Control of AC Microgrids", Aug. 2014, The University of Texas at Arlington (Year: 2014).*

(Continued)

*Primary Examiner* — Santosh R Poudel
(74) *Attorney, Agent, or Firm* — Thomas Horstemeyer, LLP

(57) ABSTRACT

Disclosed are systems and methods relating to managing and sharing resources within a spatially-distributed electrical power network in a fully distributed fashion. The electrical power network includes source nodes each having a power source and a local controller. The electrical power network includes a physical layer where the source nodes are connected to a power distribution network including one or more loads. The electrical power network also includes a communication layer for communicating power information between source nodes and neighbor source nodes of the electrical power network.

20 Claims, 10 Drawing Sheets

(51) Int. Cl.
  *H02J 13/00* (2006.01)
  *H02J 3/18* (2006.01)
(52) U.S. Cl.
  CPC ............ *H02J 13/0079* (2013.01); *H04W 4/50* (2018.02); *H02J 2203/20* (2020.01); *Y02E 40/30* (2013.01); *Y02E 40/74* (2013.01); *Y02E 60/76* (2013.01); *Y04S 10/22* (2013.01); *Y04S 10/40* (2013.01); *Y04S 40/22* (2013.01)
(58) Field of Classification Search
  CPC ........ H04W 4/001; Y02E 40/30; Y02E 40/74; Y02E 40/76; Y04S 10/22; Y04S 10/40
  USPC ........................................................ 700/286
  See application file for complete search history.

(56) References Cited

U.S. PATENT DOCUMENTS

| | | | | |
|---|---|---|---|---|
| 2002/0036430 | A1* | 3/2002 | Welches | F02G 1/043 307/18 |
| 2006/0119325 | A1* | 6/2006 | Mrowiec | H02J 3/44 322/22 |
| 2012/0143385 | A1* | 6/2012 | Goldsmith | H02J 3/38 700/297 |
| 2013/0134790 | A1* | 5/2013 | Amaratunga | H02J 3/40 307/87 |
| 2013/0338843 | A1* | 12/2013 | Iravani | H02J 4/00 700/295 |
| 2013/0338845 | A1* | 12/2013 | Jerphagnon | H02J 4/00 700/297 |
| 2014/0148966 | A1* | 5/2014 | Salama | G05B 13/02 700/298 |
| 2015/0028851 | A1* | 1/2015 | Ohori | G01R 19/2513 324/76.82 |
| 2015/0177761 | A1* | 6/2015 | Benosman | H02J 3/381 700/297 |
| 2015/0241896 | A1* | 8/2015 | Nishibayashi | G05B 15/02 700/286 |
| 2015/0311716 | A1* | 10/2015 | He | H02J 3/16 700/287 |
| 2016/0028235 | A1* | 1/2016 | Sun | H02J 3/16 700/298 |
| 2016/0062380 | A1* | 3/2016 | Schwarz | G05F 1/66 700/295 |
| 2016/0134201 | A1* | 5/2016 | Lu | H02M 7/44 363/71 |

OTHER PUBLICATIONS

Guerrero et al. "Decentralized Control for Parallel Operation of Distributed Generation Inverters Using Resistive Output Impedance" IEEE Transactions on Industrial Electronics, vol. 54, No. 2, Apr. 2007. (Year: 2007).*
Yazdanian et al. "Distributed Control Techniques in Microgrids", IEEE Transactions on Smart Grid, vol. 5, No. 6, Nov. 2014 (Year: 2014).*
Ali et al. "Distributed Cooperative Secondary Control of Microgrids Using Feedback Linearization", Aug. 2013, IEEE, vol. 28, pp. 3462-3469 (Year: 2013).*
V. Nasirian, Q. Shafiee, J. M. Guerrero, F. L. Lewis, and A. Davoudi, "Droop-free distributed control for AC microgrids," IEEE Trans. Power Electron., submitted on Oct. 2014, Manuscript ID: TPEL-REG-2014-10-1709. (Decision as of Dec. 3, 2014: Provisionally Recommended for Publication).
V. Nasirian, Q. Shafiee, J. M. Guerrero, F. L. Lewis, and A. Davoudi, "Droop-free team-oriented control for AC distribution systems," 30th IEEE Appl. Power Electron. Conf. Expo. (APEC), 2015, accepted, to be presented/published in Mar. 2015.
C. K. Sao and W. Lehn, "Control and power management of converter-fed microgrids," IEEE Trans. Power Syst., vol. 23, pp. 1088-1098, Aug. 2008.

E. Serban and H. Serban, "A control strategy for a distributed power generation microgrid application with voltage- and current-controlled source converter," IEEE Trans. Power Electron., vol. 15, pp. 2981-2992, Dec. 2010.
A. Bidram and A. Davoudi, "Hierarchical structure of microgrids control system," IEEE Trans. Smart Grid, vol. 3, pp. 1963-1976, Dec. 2012.
J. A. P. Lopes, C. L. Moreira, and A. G. Madureira, "Defining control strategies for microgrids islanded operation," IEEE Trans. Power Syst., vol. 21, pp. 916-924, May 2006.
F. Katiraei, M. R. Iravani, and P. W. Lehn, "Microgrid autonomous operation during and subsequent to islanding process," IEEE Trans. Power Del., vol. 20, pp. 248-257, Jan. 2005.
M. Savaghebi, A. Jalilian, J. Vasquez, and J. Guerrero, "Secondary control for voltage quality enhancement in microgrids," IEEE Trans. Smart Grid, vol. 3, pp. 1893-1902, Dec. 2012.
N. Ainsworth and S. Grijalva, "A structure-preserving model and sufficient condition of frequency synchronization of lossless droop inverter-based ac network," IEEE Trans. Power Syst., vol. 28, pp. 4310-4319, Nov. 2013.
D. Wu, F. Tang, J. M. Guerrero, and J. C. Vasquez, "Autonomous control of distributed generation and storage to coordinate P/Q sharing in islanded microgrids—An approach beyond droop control," in Proc. IEEE Int. Energy Conf., 2014, pp. 983-988.
J. Y. Kim, J. H. Jeon, S. K. Kim, C. Cho, J. H. Park, H. M. Kim, and K. Y. Nam, "Cooperative control strategy of energy storage system and micro sources for stabilizing the microgrid during islanded operation," IEEE Trans. Power Electron., vol. 25, pp. 3037-3048, Dec. 2010.
S. M. Ashabani and Y. A. R. I. Mohamed, "General interface for power management of micro-grids using nonlinear cooperative droop control," IEEE Trans. Power Syst., vol. 28, pp. 2929-2941, Aug. 2011.
J. Hu, J. Zhu, D. G. Dorrell, and J. M. Guerrero, "Virtual flux droop method—A new control strategy of inverters in microgrids," IEEE Trans. Power Electron., vol. 29, pp. 4704-4711, Sep. 2014.
Y. A. I. Mohamed and E. F. El-Saadany, "Adaptive decentralized droop controller to preserve power sharing stability of paralleled inveretrs in distributed generation microgrids," IEEE Trans. Power Electronics, vol. 23, pp. 2806-2816, Nov. 2008.
J. He and Y. W. Li, "Analysis, design, and implementation of virtual impedance for power electronics interfaced distributed generation," IEEE Trans. Ind. Appl., vol. 41, pp. 2525-2538, Nov./Dec. 2011.
J. W. Simpson-Porco, F. Dorfler, and F. Bullo, "Voltage stabilization in microgrids via quadratic droop control," IEEE 52nd Annu. Conf. Decision and Control, 2013, pp. 7582-7589.
M. Chandorkar, D. Divan, and R. Adapa, "Control of parallel connected inverters in standalone AC supply systems," IEEE Trans. Ind. Appl., vol. 29, pp. 136-143, Jan. 1993.
K. D. Brabandere, B. Bolsens, J. V. D. Keybus, A. Woyte, J. Driesen, and R. Belmans, "A voltage and frequency droop control method for parallel inverters," IEEE Trans. Power Electron., vol. 22, pp. 1107-1115, Jul. 2007.
J. Rocabert, A. Luna, F. Blaabjerg, and P. Rodriguez, "Control of power converters in ac microgrids," IEEE Trans. Dower Electron., vol. 27, pp. 4734-4749, Nov. 2012.
C. T. Lee, C. C. Chu, and P. T. Cheng, "A new droop control method for the autonomous operation for distribute energy resource interface converters," IEEE Trans. Power Electron., vol. 28, pp. 1980-1993, Apr. 2013.
Q. Shafiee, C. Stefanovic, T. Dragicevic, P. Popovski, J. C. Vasquez, and J. M. Guerrero, "Robust networked control scheme for distributed secondary pontrol of islanded microgrids," IEEE Trans. Ind. Electron., vol. 61, pp. 5363-5374, Oct. 2014.
Y. Zhang and H. Ma, "Theoretical and experimental investigation of networked control for parallel operation of inverters," IEEE Trans. Ind. Electron., vol. 59, pp. 1961-1970, Apr. 2012.
M. N. Marwali and A. Keyhani, "Control of distributed generation systems—Part I: Voltages and currents control," IEEE Trans. Power Electron., vol. 19, pp. 1541-1550, Nov. 2004.
M. N. Marwali, J. W. Jung, and A. Keyhani, "Stability analysis of load sharing control for distributed generation systems," IEEE Trans. Energy Convers., vol. 22, pp. 737-745, Sep. 2004.

(56) References Cited

OTHER PUBLICATIONS

S. D. J. McArthur, E. M. Davidson, V. M. Catterson, A. L. Dimeas, N. D. Hatziargyriou, F. Ponci, and T. Funabashi, "Multi-agent systems for power engineering applications—part I: Concepts, approaches, and technical challenges," IEEE Trans. Power Syst., vol. 22, pp. 1743-1752, Nov. 2007.

A. Bidram, A. Davoudi, and F. L. Lewis, "A multi-objective distributed control framework for islanded microgrids," IEEE Trans. Ind. Informatics, vol. 10, No. 3, pp. 1785-1798, Aug. 2014.

V. Nasirian, A. Davoudi, and F. L. Lewis, "Distributed adaptive droop control for dc microgrids," in Proc. 29th IEEE Appl. Power Electron. Conf. Expo. (APEC), 2014, pp. 1147-1152.

A. Bidram, A. Davoudi, F. L. Lewis, and Z. Qu, "Secondary control of microgrids based on distributed cooperative control of multi-agent systems," IET Generation, Transmission Dist., vol. 7, pp. 822-831, Aug. 2013.

A. D. Dominguez-Garcia, C. N. Hadjicostis, and N. F. Vaidya, "Resilient networked control of distributed energy resources," IEEE J. Sel. Areas Commun., vol. 30, pp. 113-1148, Jul. 2012.

S. T. Cady and A. D. Dominguez-Garcia, "Distributed generation control of small-footprint power systems," in Proc. North American Power Symp., 2012, pp. 1-6.

F. Dorfler, J. W. Simpson-Porco, and F. Bullo, "Breaking the hierarchy: Distributed control and economic optimality in microgrids," 2014, Available on arXiv:1401.1767v1.

H. Bouattour, J. W. Simpson-Porco, F. Darner, and F. Bullo, "Further results on distribute secondary control in microgrids," IEEE Conf. on Decision and Control, 2013, pp. 1514-1519.

J. W. Simpson-Porco, F. Dorfler, F. Bullo, Q. Shafiee, and J. M. Guerrero, "Stability, power sharing, and distributed secondary control in droopcontrolled microgrids," IEEE Smart Grid Commun. Symp., 2013, pp. 672-677.

J. W. Simpson-Porco, F. Dorfler, and F. Bullo, "Synchronization and power sharing for droop-controlled inverters in islanded microgrids," Automatica, vol. 49, pp. 2603-2611, Jun. 2013.

R. Olfati-saber, J. A. Fax, and R. M. Murray, "Consensus and cooperation in networked multi-agent systems," Proc. IEEE, vol. 95, No. 1, pp. 215-233, Jan. 2007.

\* cited by examiner

SYSTEM AND METHOD FOR DISTRIBUTED CONTROL OF AN ELECTRICAL NETWORK

CROSS-REFERENCE TO RELATED APPLICATIONS

This application claims priority to U.S. Provisional Application No. 62/133,974 filed on Mar. 16, 2015 and entitled "SYSTEM AND METHOD FOR DISTRIBUTED CONTROL OF AN ELECTRICAL NETWORK," which is incorporated herein by reference in its entirety.

STATEMENT REGARDING FEDERALLY SPONSORED RESEARCH OR DEVELOPMENT

This invention is based in part upon work supported by the National Science Foundation under Grant Nos. EECS-1137354, EECS-1405173 and by the Office of Naval Research under Grant No N00014-14-1-0718. The government has certain rights in the invention.

FIELD OF THE INVENTION

The present disclosure relates generally to systems and methods for electric utilities that can work in aggregation or islanded from the legacy power grid, and more specifically to distributed and real-time control and coordination of such networks.

BACKGROUND

A microgrid is a small-scale electrical power network that can operate separately from the traditional/legacy main electrical network (U.S. Power Grid). Traditional electrical power networks typically include centralized architectures and do not readily support the connection of distributed energy assets due to power system and communication network constraints. Traditional systems rely on supervisory control or central control and coordination of generation and distribution of energy between source and consumption nodes of an energy grid.

SUMMARY

Included are systems and methods related to a distributed droop-free controller for electrical power network. One embodiment of a system, among others, includes an electrical power network comprising a plurality of source nodes coupled to a respective transmission line of a distribution network, wherein each source node of the plurality of source nodes comprises a power source and a local controller, and a communication network configured to facilitate an exchange of information between a respective source node and a respective predefined subset of the plurality of source nodes, the respective subset of the plurality of source nodes comprising one or more neighbor source nodes of the respective source node.

Another embodiment of a system, among others, includes an electrical power network comprising a physical layer comprising a plurality of source nodes coupled to a transmission network via a plurality of respective transmission lines, individual ones of the source nodes comprising a power source and a local controller, and the electrical power network lacking a centralized controller, and a communication layer comprising a communication network of the plurality of source nodes grouped into a plurality of source node subsets for communicating power information, individual ones of the plurality of source node subsets comprising a respective source node and one or more predefined neighbor source nodes of the respective source node, the respective source node being connected to the one or more predefined neighbor source nodes via a respective communication link.

Another embodiment of a method, among others, includes a method for managing load sharing in an electrical power network, the method comprising receiving neighbor power information from a neighbor source node of the electrical power network, wherein the source node comprises a power source and a local controller, and the source node is designated to communicate with the neighbor source node via a predefined communication network, determining local power information of the respective source node, and updating at least one of a voltage magnitude, or a phase angle of the power source of the source node, based, at least, in part on the local power information of the source node and the neighbor power information.

Other embodiments, systems, methods, features, and advantages of this disclosure will be or will become apparent to one with skill in the art upon examination of the following drawings and detailed description. It is intended that all such additional apparatuses, features, and advantages be included within this description and be within the scope of the present disclosure.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding, but not necessarily the same, parts throughout the several views.

FIG. 8A illustrates a graphical representation of the performance the controller according to the bus voltage (phase-to-neutral). FIG. 8B illustrates a graphical representation of the performance the controller according to the inverter frequency set points. FIG. 8C illustrates a graphical representation of the performance the controller according to the first-voltage correction term. FIG. 8D illustrates a graphical representation of the performance the controller according to the second-voltage correction term. FIG. 8E illustrates a graphical representation of the performance the controller according to the supplied reactive power. FIG. 8F illustrates a graphical representation of the performance the controller according to the supplied active power. FIG. 8G illustrates a graphical representation of the performance the controller according to the load reactive power. FIG. 8H illustrates a graphical representation of the performance the controller according to the load active power.

DETAILED DESCRIPTION

Figure 1A:
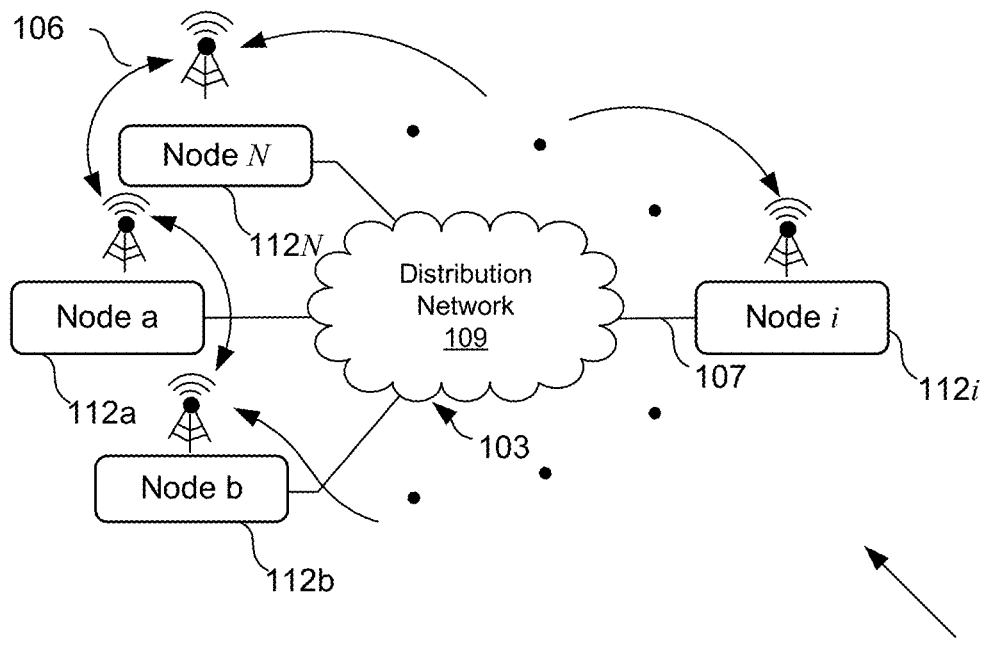
FIG. 1A is a system diagram of an example of an electrical power network according to various embodiments of the present disclosure.

The present disclosure relates to systems and methods for managing and sharing resources within an electrical power network (e.g., a microgrid, main power network, etc.). According to various embodiments of the present disclosure, a cooperative distributed control paradigm replaces the traditional centralized secondary control and the primary-level droop mechanism of an inverter of traditional electrical power networks. Specifically, the electrical power network of the present disclosure includes local controllers at each node of the electrical power network and does not rely on droop mechanisms of the inverters. According to various embodiments, a sparse communication network is spanned across the electrical power network to facilitate limited data exchange among inverter controllers.

Traditional electrical power networks are designed as a centralized architecture and do not readily support the connection of distributed energy assets due to power system and communication network constraints. This in turn prohibits the interconnection of additional distributed generation (e.g., renewable) and other energy resources effectively due to (1) the lack of a way to control different dissimilar assets cost effectively, (2) the lack of a way to unify systems and network asset nodes in order to manage these resources, (3) the lack of secure protocols for distributed in-field systems, (4) existing industry protocols that are inherently insecure for transport over public or vulnerable networks, (5) the lack of a system for integrating legacy protocols into a secure network, (6) the limited ability to update and deploy customized functionality to nodes over the air, and (7) the lack of system flexibility to support innovation/applications in control, analytics, and monitoring of an electrical feeder network.

Traditional systems rely on supervisory control or central control and coordination in generation and distribution of energy between source and consumption nodes of an energy grid. As the emerging energy systems offer wide integration of distributed generation and consumption of energy, there is a need for distributed control alternatives to liberate the decision making. Some distributed control systems that have been proposed subscribe to hierarchical control architecture. This hierarchical model has its own deficiencies, such as scalability and flexibility. Such architecture for the central controller or any of the communication links poses a single point of failure. Also, such models require a complex communication that make it difficult to add and subtract energy nodes in a plug-n-play fashion.

Microgrids are small-scale energy grids that are either independent energy grids on their own (islanded from a bigger energy grid (e.g., a legacy grid)) or in aggregate with the large legacy power grid. Microgrids provide some key advantages over conventional energy grids for example, improved efficiency, reliability, and expandability. Direct Current (DC) energy resources, for example, photovoltaic arrays, storage elements, and fuel cells, are conventionally connected to an alternating current (AC) microgrid distribution network via voltage-source inverters.

A three-tier hierarchical control structure is conventionally adopted for the microgrid operation. The primary control, conventionally realized through a droop mechanism, operates on a fast timescale and regulates output voltage of the inverters and handles proportional load sharing among the inverters. The primary control shares the total load demand among sources in proportion to their power ratings and is practiced to avoid overstressing and aging of the sources. In traditional microgrids, the secondary control compensates for the voltage and frequency deviations caused by the primary control by updating inverter voltage/ frequency set points. Ultimately, a tertiary control carries out the scheduled power exchange within the microgrid, or between the microgrid and the main grid, over a longer timescale.

Droop mechanism, or its equivalents, is a decentralized approach to realize the primary control. Droop mechanism emulates virtual inertia for AC systems and mimics the role of governors in traditional synchronous generators. The droop mechanism suffers from load-dependent frequency/ voltage deviation, poor performance in handling nonlinear loads, and poor reactive power sharing in presence of unequal bus voltages. Unequal bus voltages are indispensable in practical systems to perform the scheduled reactive power flow. Droop techniques cause voltage and frequency deviations, thus a supervisory secondary control is inevitable to update the set points of the local primary controls. For example, GPS-coordinated time referencing handles frequency synchronization across the microgrids. Such architecture requires two-way high bandwidth communication links between the central controller and each inverter. This protocol adversely affects the system reliability as failure of any communication link hinders the functionality of the central controller and eventually hinders the functionality of the entire microgrid. The central controller itself is also a reliability risk since it exposes a single point-of-failure. Scalability is another issue for that it adds to the complexity of the communication network and it requires updating the settings of the central controller to add or remove even one node.

Distributed control techniques are, thus, suitable solutions to the control and coordination of spatially dispersed inverter-based (also known as distributed generation) electrical power networks. Existing networked control architectures, comprising a master node (e.g., the primary node) and slave nodes, may discharge duties of a central controller while being resilient to faults or unknown system parameters. Distributed synchronization processes necessitate that each agent (e.g., the inverter) exchange information with the other agents in the microgrid according to some restricted communication protocol. These controllers can use a sparse communication network and have less computational complexity at each controller. Networked control of parallel inverters embeds the functionality of the secondary control in all inverters and, thus, requires a fully connected communication network. The master node (e.g., the primary node) in the networked master-slave methods is still a single point-of-failure.

The majority of such approaches are still based on the droop mechanism and inherit similar shortcomings, such as requiring system information (e.g., number of inverters, inverter parameters, and total load demand), requiring frequency measurement, and also handling active power sharing and frequency regulation (or, only reactive power sharing/voltage control). Recent improvements relate to distribution networks with negligible line impedances that can lack satisfactory performance in practical multi-terminal distribution systems with complex, intricate and inefficient transmission networks. In such traditional systems, a single source is also assigned as a leader that relays the rated frequency and voltage set points to other sources through a communication network. Moreover, such solutions focus on the islanded mode of operation and their extension to grid-connected mode would require some redesign or new modified control methods or both.

What is needed is a fully distributed control method for energy systems which is not affected by one or more communication link failures and has a plug and play functionality to add and remove inverters and loads immaterial of their rating. The systems and methods of the present disclosure relate to such a distributed electrical power network. Specifically, the present disclosure provides a comprehensive distribute cooperative solution that satisfies both the secondary and the primary control objectives for an electrical power network without relying on the droop mechanism. Each source node comprising a source, inverter, and controller is considered as an agent of a multi-agent system (e.g., a microgrid) and exchanges data with one or more neighbor nodes. The source nodes process the information received from the neighbors as well as the information of the local source node to update the local voltage set points and synchronize the normalized power and frequencies.

In various embodiments, cooperation among agents on a communication graph provides two voltage correction terms to be added to the rated voltage for adjustment of the local voltage set points of individual agents (e.g., source nodes). In some embodiments, cooperation among voltage, reactive power, and active power regulators effectively carry out global voltage regulation, frequency synchronization, and proportional load sharing in networks where the transmission/distribution line impedances are not negligible. In some embodiments, the rated values, embedded in a local controller, can be manipulated to achieve any desired load sharing. In some embodiments, the voltage regulator seeks to adjust the average voltage across the electrical power network, rather than the individual inverter bus, at the rated voltage value, to ensure global voltage regulation, thus eliminating the need to run a power flow analysis. In some embodiments, the control method does not employ any droop mechanism and does not require any frequency measurement. In some embodiments, source nodes do not require prior knowledge of system parameters or the number of agents. Thus, it enables seamless scalability, modularity, robustness (independent of loads), and plug-and-play capability for agents or loads. In some embodiments only a sparse communication graph is sufficient for the limited message passing among agents. This is in direct contrast with the centralized control approaches that require high-bandwidth bidirectional communication networks, or existing networked control techniques that require fully-connected communication graphs.

A power distribution network is a network that provides the physical connection between sources and loads within an electrical power network. Such a physical system may also be equipped with a physical communications or cyber-communications network to exploit different control opportunities. Interaction of the sources (e.g., inverter-augmented DC sources) in the cyber domain can offer cooperative decision making, which features scalability and improves reliability. Various embodiments of the present disclosure relate to a cyber-physical system with a communication network that facilitates data exchange among sources for control and monitoring purposes.

The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, an apparatus that "comprises," "has," "includes" or "contains" one or more elements possesses those one or more elements, but is not limited to possessing only those elements. Likewise, a method that "comprises," "has," "includes," or "contains" one or more steps possesses those one or more steps, but is not limited to possessing only those one or more steps.

Any embodiment of any of the apparatuses, systems, and methods can consist of or consist essentially of rather than comprise/include/contain/have any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments. Details associated with the embodiments described above and others are described below.

Turning now to FIG. 1A, shown is a drawing of an example an electrical power network 100 according to various embodiments of the present disclosure. Specifically, FIG. 1A illustrates both the physical layer 103 and communication layer/network 106 of the electrical power network. The distributed electrical power network 100 comprises a plurality of source nodes 112 (e.g., 112a, 112b, 112N, 112i) associated with a respective power source 206 (FIG. 2) that are connected via the physical layer 103 and the communication layer 106. The physical layer 103 comprises the plurality of source nodes 112 connected to a corresponding transmission bus 107 used to transmit power to various loads 703 (FIG. 7) within the distribution network 109. The communication layer 106, as described in greater detail in FIG. 1B, corresponds to the structure of communication between one or more source nodes 112. The communication between the one or more source nodes 112 can be wired and/or wireless.

Figure 1B:
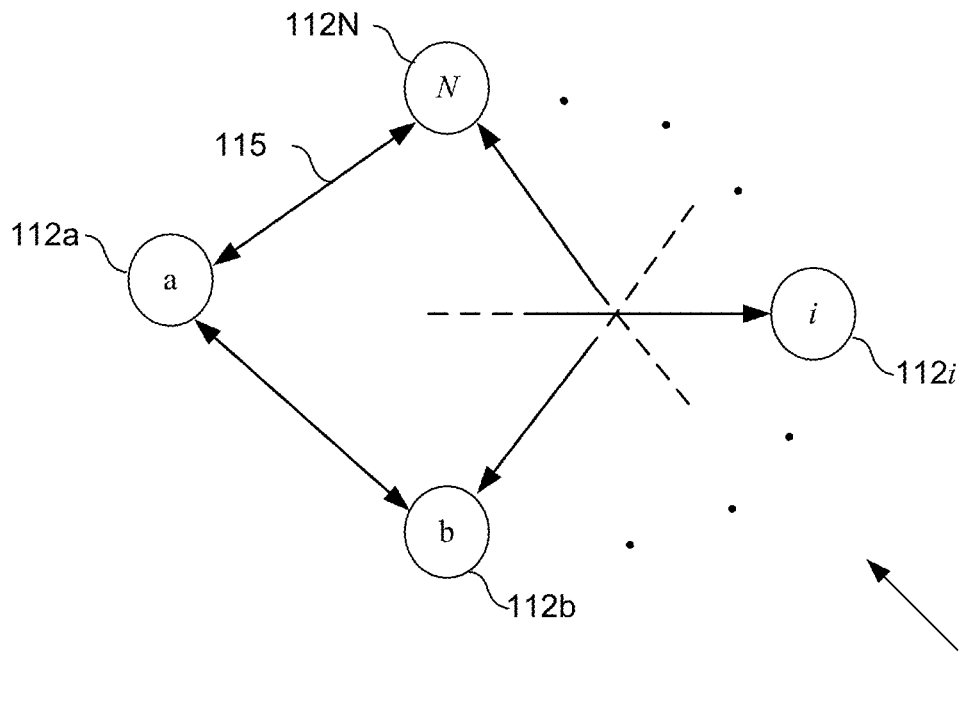
FIG. 1B is a system diagram of an example of a communication network of the electrical power network of FIG. 1A according to various embodiments of the present disclosure.

In various embodiments, each source node 112 broadcasts and/or transmits information 203 (see FIG. 2) (e.g., voltage measurements, power measurements, etc.) to a subset of the plurality of source nodes 112 as defined via the communication network 106. The subset of the plurality of source nodes 112 are referred to herein as neighbor nodes. The neighbor nodes 112 for each source node 112 are predefined. As opposed to the centralized/supervisory control, the electrical power network 100 forms a sparse electrical power network 100 such that not all source nodes 112 need to communicate either directly or indirectly with each other. It should be noted that, while the neighbor nodes 112 shown in FIGS. 1A and 1B are adjacent to the respective source nodes 112, the neighbor nodes 112 are not required to be adjacent to one another. In some embodiments, the neighbor nodes 112 are randomly selected. In other embodiments, the neighbor nodes 112 are specifically selected according to a specific criteria (e.g., physical vicinity, power generation cost, structural similarity, etc.). As can be appreciated, the neighbor nodes 112 can be selected in various ways so long as the distributed electrical power network 100 corresponds to a sparse graph with 1) at least a spanning tree, 2) a balanced Laplacian matrix, and 3) a minimum communication redundancy.

Turning now to FIG. 1B, shown is a drawing of an example of the communication layer 106 of the distributed electrical power network 100 according to various embodiments of the present disclosure. In some embodiments, the electrical power network 100 as a multi-agent cyber-physical system can be expressed with a graphical representation with active agents (sources) modeled as nodes 112 of the graph and communication links 115 mapped to edges connecting node 112.

In some embodiments, the communication links 115 are not reciprocal and a directed graph (digraph) is formed. Each node 112 and edge inherits the dynamic model of the corresponding node 112 and communication channel 115, respectively. Communication links 115 may exchange information 203 (See FIG. 2) with different gains referred to as the communication weights. In one non-limiting example, if Node j broadcasts and/or transmits data $x_j$ to Node i through a link with designated a weight of $a_{ij}>0$, then, the information 203 received at Node i is $a_{ij}x_j$. Generally, $a_{ij}>0$ if Node i receives information 203 from Node j and $a_{ij}=0$, otherwise. Such a graph is usually represented by an associated adjacency matrix $A_G=[a_{ij}]\in\mathbb{R}^{N\times N}$ that carries the communication weights, where N is the number of dispatchable sources 206.

In some embodiments, the communication weights are time varying and can include some channel delay. In other embodiments, the communication weights are time-invariant and a scalar adjacency matrix is assumed. $N_i$ denotes the set of all neighbors of Node i. The in-degree and out-degree matrices $D^{in}=\text{diag}\{d_i^{in}\}$ and $D^{out}=\text{diag}\{d_i^{out}\}$ are diagonal matrices with $d_i^{in}=\Sigma_{j\in N_i} a_{ij}$ and $d_i^{out}=\Sigma_{j\in N_i} a_{ji}$, respectively. The Laplacian matrix is defined as $L \triangleq D^{in}-A_G$, whose eigenvalues determine the global dynamics of the entire electrical power network 100. The Laplacian matrix is balanced if the in-degree and out-degree matrices are equal; particularly, an undirected (bidirectional) data network satisfies this requirement. A direct path from Node i to Node j is a sequence of edges that connects the two nodes 112. A digraph is said to have a spanning tree if it contains a root node, from which, there exists at least a direct path to every other node 112. A graph is called to carry the minimum redundancy if it contains enough redundant links that, in the case of any single link failure, the electrical power network 100 remains connected and presents a balanced Laplacian matrix. Thus, the electrical power network 100 as described in this embodiment is resilient to failure due to a broken communication link 115.

Various embodiments of the present disclosure relate to a control method. The control method requires a communication network 106 with the adjacency matrix $A_G=[a_{ij}]\in\mathbb{R}^{N\times N}$ that has a spanning tree, may be undirected or directional, yet with a balanced Laplacian matrix, and that carries the minimum redundancy. Communication weights, $a_{ij}$, are design parameters. Each source node 112 exchanges a vector of information 203, $\Psi_i=[\bar{e}_i, p_i^{norm}, q_i^{norm}]$, with its neighbor source nodes 112 on the communication network 106, where $\bar{e}_i$ is the estimation of the averaged voltage magnitude across the microgrid, processed at Node i. $p_i^{norm} \triangleq p_i/p_i^{rated}$ and $q_i^{norm} \triangleq q_i/q_i^{rated}$ are the normalized active and reactive powers supplied by Node i. $p_i$ and $q_i$ are the measured active and reactive powers supplied by Node i 112, respectively, and $p_i^{rated}$ and $q_i^{rated}$ are the rated active and reactive powers of the same source 206. The control method attempts to share the load among sources in proportion to their rated powers.

Figure 2:
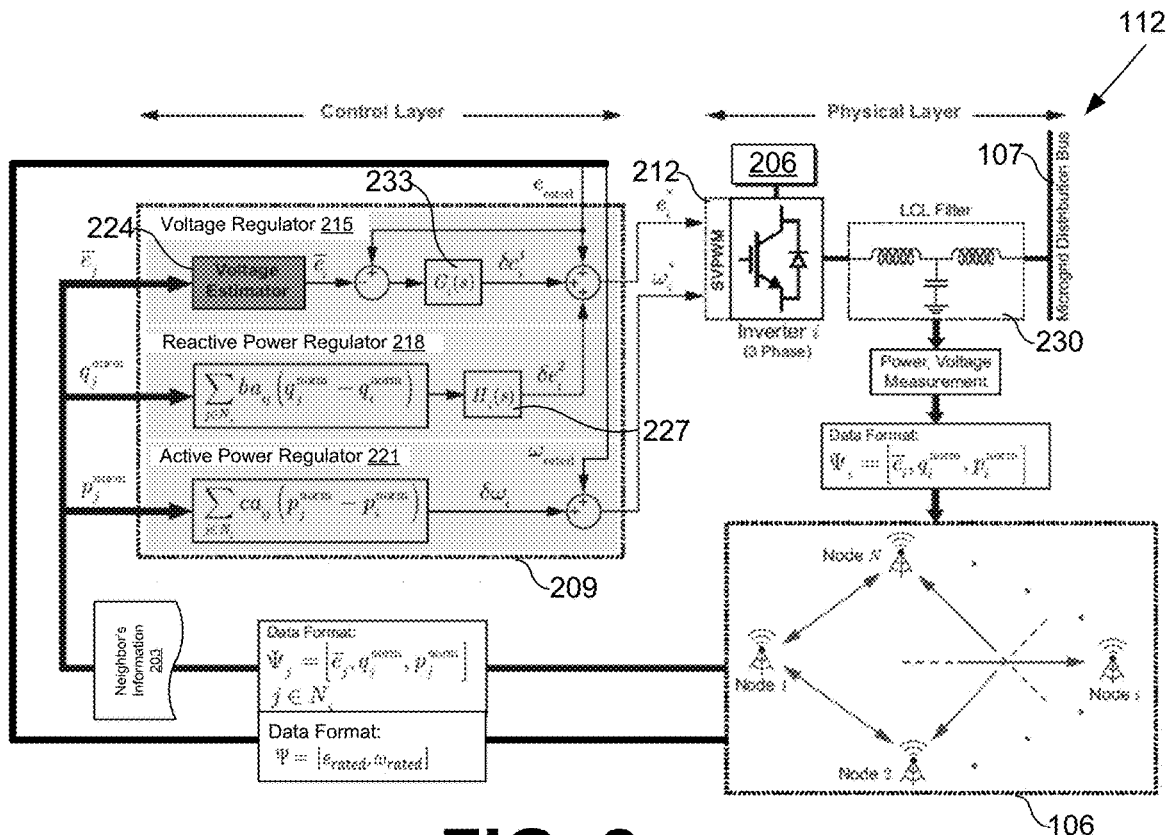
FIG. 2 is a system diagram of an example of a source node of the electrical power network of FIG. 1A according to various embodiments of the present disclosure.

Moving on to FIG. 2, shown is an example of a detailed schematic of a source node 112 of the electrical power network 100, according to various embodiments of the present disclosure. The source node 112 comprises a controller 209, a source 206, and an inverter 212 in communication with one or more neighboring nodes 112 as defined by the communication network 106. In various embodiments, objectives of the controller 209 of a respective node 112 may comprise global voltage regulation, frequency synchronization, active power sharing, reactive power sharing, and/or other features. Fine adjustment of the voltage magnitude and frequency may satisfy all or at least some objectives. Particularly, active and reactive power flow can be managed by tuning the frequency and voltage magnitude, respectively. FIG. 2 shows an example schematic of the control policy for a particular node 112. For the purpose of example, the node 112 of FIG. 2 will be referred to herein as Node i.

The controller 209 is configured to processes local information and information 203 received from one or more neighbor nodes 112 to update the voltage magnitude and frequency (or, equivalently, phase angle) set points via the electrical power network 100 of the particular source node 112. The controller 209 can comprise a voltage regulator 215, a reactive power regulator 218, an active power regulator 221, and/or any other appropriate device. The voltage regulator 215 is configured to regulate the average voltage of the electric power network 100. A voltage estimator 224 of the controller 209 finds the average voltage across the electrical power network 100, which is then compared to the rated voltage to produce the first voltage correction term. For example, if the set voltage of the electrical power network 100 is predefined to be 120 V, the voltage regulator 215 is configured to regulate the average voltage of the particular node 112 to be 120 V. As such, each controller 209 for each node 112 in the electrical power network 100 regulates the voltage to be substantially equivalent to the predefined setting.

The reactive power regulator 218 is configured to manage the reactive power generation between different sources 206 to ensure that all the nodes 112 are generating substantially the same amount of reactive power. The reactive power regulator 218 at each node 112 compares its normalized reactive power with those of its neighbor nodes 112. The difference is fed to a subsequent PI controller 227 that generates the second voltage correction term. In some embodiments, the controller 209 adds the voltage correction terms to the electrical power network rated voltage (provided by the tertiary control 403 (see FIG. 4)) to generate the local voltage magnitude set point. The regulators of the controller 209 collectively adjust the average voltage of the electrical power network 100 at the rated voltage. The regulators allow different set points for different bus voltages and, thus, account for the line impedance effects. Moreover, the reactive power regulator 218 adjusts the voltage to achieve proportional reactive load sharing.

The active power regulator 221 regulates the active power and the frequency to ensure that the frequency is the same for all nodes 112 in the electrical power network 100. The active power regulator 221 compares the local normalized active power of each node 112 with the local normalized active power of the neighbor nodes 112 and uses the difference to update the frequency and, accordingly, the phase angle of the inverter 212 of the node 112. Thus, the controller 209 can accurately handle the global voltage regulation and proportional load sharing. The features of the electrical power network help in plug and play capability of more nodes 112 to the electrical power network 100 or plug and play of the entire network as islands to an existing grid or a legacy grid 406 (see FIG. 4) and resiliency to failures of some communication links 115.

The source 206 of the source node 112 can comprise any type of power source such as, for example, a PV panel, a battery, a wind turbine, a fuel cell, a diesel generator, and/or any other AC or DC power source. The inverter 212 is configured to convert DC to AC according to various embodiments of the present disclosure.

The controller 209 at Node i receives information 203 from the neighbor nodes 112, $\Psi_j$s. This information may comprise a frequency, a voltage, a current, a power, and/or any other appropriate information associated with the particular neighbor node 112. The controller 209 processes the information 203 of the neighbor nodes 112 as well as its own local information, $\Psi_i$, to update its voltage set point. $e_i^*$ and $w_i^*$ are the set points of the (line to neutral) voltage magnitude (root mean square value) and frequency, respectively. Accordingly, a space vector pulse width modulation (SVPWM) module generates the actual voltage set point, $v_i^*$ $$v_i^*(t) = e_i^*(t)\sqrt{2} \sin(\int_0^t w_i^*(\tau) d\tau) \qquad (1)$$

and assigns appropriate switching signals to drive the inverter module. It should be noted that the controller is assumed activated at t=0. As seen in FIG. 2, each inverter 212 is followed by an LCL filter 230 to attenuate undesired (switching and line-frequency) harmonics. The set point in Equation (1) may be the reference voltage for the output terminal of the filtering module or, equivalently, the microgrid bus that corresponds to Source i 206.

The voltage regulator 215 and the reactive power regulator 218 adjust the set point of the voltage magnitude by producing two voltage correction terms, $\delta e_i^1$ and $\delta e_i^2$, respectively, as $$e_i^*(t) = e_{rated} + \delta e_i^1(t) + \delta e_i^2(t) \qquad (2)$$

where $e_{rated}$ is the rated voltage magnitude of the microgrid. Regardless of the operating mode of the electrical power network 100, (i.e., islanded or grid-connected modes), the rated voltage can be safely assumed equal for all active nodes 112 (e.g., dispatchable sources). The voltage regulator 215 at Node i includes a voltage estimator 224 that finds the global averaged voltage magnitude, i.e., the averaged voltage across the electrical power network 100. This estimation is compared with the rated voltage, $e_{rated}$, and the difference is fed to a proportional integral (PI) controller, $G_i$, 233 to generate the first voltage correction term, $\delta e_i^1$, and thus handle global voltage regulation. Accordingly, the voltage regulator 215 collectively adjusts the average voltage of the electrical power network 100 on the rated value. Individual bus voltages may slightly deviate from the rated value. This deviation is essential in practice to navigate reactive power across the electrical power network 100. Therefore, the reactive power regulator 218 at Node i adjusts an additional (i.e., the second) voltage correction term, $\delta e_i^2$, to control the supplied reactive power.

The reactive power regulator 218 calculates the neighborhood reactive loading mismatch, $mq_i$, $$mq_i = \sum_{j \in N_i} ba_{ij}(q_j^{norm} - q_i^{norm}) \qquad (3)$$

which measures how far is the normalized reactive power of the Node i from the average of its neighbor sources 206. The coupling gain b is a design parameter. The mismatch in Equation (3) is then fed to another PI controller, $H_i$, 227 to adjust the second voltage correction term, $\delta e_i^2$, and, accordingly, mitigate the mismatch. All the mismatch terms, in the steady state, converge to zero and, thus, all normalized reactive powers synchronize, satisfying the proportional reactive power sharing among sources 206.

The active power regulator 221 controls frequency and active power of the source 206. The active power regulator 221 calculates the neighborhood active loading mismatch to assign the frequency correction term, $\delta w_i$, $$\delta \omega_i = \sum_{j \in N_i} ca_{ij}(p_j^{norm} - p_i^{norm}) \qquad (4)$$

where the coupling gain c may be a design parameter or have a value of "1." As seen in FIG. 2, this correction term is added to the rated frequency, $w_{rated}$, $$\omega_i^*(t) = \omega_{rated} + \delta\omega_i(t) \qquad (5)$$

and, thus, Equation (1) can be written as $$v_i^*(t) = e_i^*(t)\sqrt{2} \sin(\omega_{rated} t + \int_0^t \delta\omega_i d\tau) \qquad (6)$$

Equation (6) helps to define the phase angle set point for Node i, $$\delta_i^*(t) \triangleq c \int_0^t \sum_{j \in N_i} a_{ij}(p_j^{norm} - p_i^{norm}) d\tau \qquad (7)$$

According to Equations (6) and (7), the active power regulator 221 keeps the frequency at the rated value and fine tunes the phase angle set point, $\delta_i^*$, to reroute the active power across the electrical power network 100 and mitigate the neighborhood active loading mismatch. All phase angles, $\delta_i^*$, will converge to their steady-state values and, thus, all frequency correction terms, $\delta w_i$, decay to zero. Therefore, the frequency of the electrical power network 100 synchronizes to the rated frequency, $w_{rated}$, without any frequency measurement loop, while the controller 209 stabilizes the phase angles, $\delta_i$. Indeed, transient variations in the inverter frequency adjust the phase angle of the inverter 212 and control the active power flow. The frequency will not deviate from the rated value in the steady state and normalized active powers will synchronize, which provides the proportional active load sharing.

In various embodiments, the controller 209 of the present disclosure is a general solution that can handle load sharing for variety of distribution networks 109, such as, for example, predominantly inductive networks, inductive-resistive networks, primarily resistive networks and/or any other appropriate type of network. The nature of the line impedances defines the role of the active power regulators 221 and reactive power regulators 218 (see FIG. 2) for load sharing. For example, a predominantly inductive network naturally decouples the load sharing process and the reactive power regulator 218 must handle the reactive load sharing by adjusting voltage magnitude while the active power regulator 221 handles the active load sharing through adjusting the frequency (or, equivalently, the phase angle). However, for other types of distribution networks, active and reactive power flows are entangled to both voltage and phase angle adjustment. For such cases, the load sharing is a collaborative task where the active power regulator 221 and reactive power regulator 218 would work together to generate the desired set points.

Figure 3:
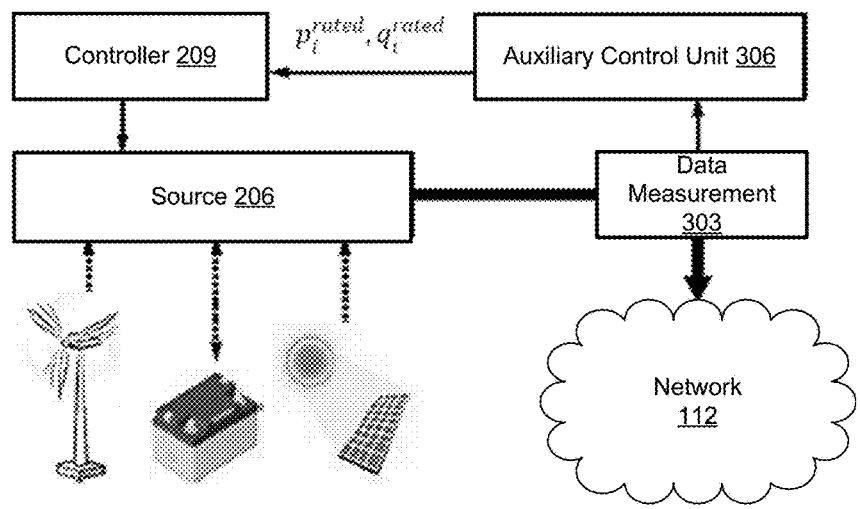
FIG. 3 is a system diagram of an example of a source node of the electrical power network of FIG. 1A that includes a non-dispatchable source according to various embodiments of the present disclosure.

Turning now to FIG. 3, shown is a drawing of an example of a node 112 where the source 206 is non-dispatchable (e.g., renewable energy sources with stochastic power output) according to various embodiments of the present disclosure. In such embodiments, the controller 209 may be augmented with the methodology shown in FIG. 3. Supplied power by each stochastic source 206 is measured via a data measurement module 303 and reported to an auxiliary control unit 306. The auxiliary control unit 306 can run optimization scenarios (e.g., Maximum Power Point Tracking (MPPT)) to decide the desired operating points. The controller 209 can compare the desired generation with the actual supplied power and update the rated powers, $p_i^{rated}$ and $q_i^{rated}$, to address any mismatch. The control method of FIG. 2 uses the tuned rated powers to adjust the voltage and frequency set points. With the modification in FIG. 3, the stochastic sources 206 can be pushed to exploit individual potentials (e.g., to produce maximum power) while the controller 209 in FIG. 2 can proportionally share the remaining load demand among dispatchable sources 206.

Figure 4:
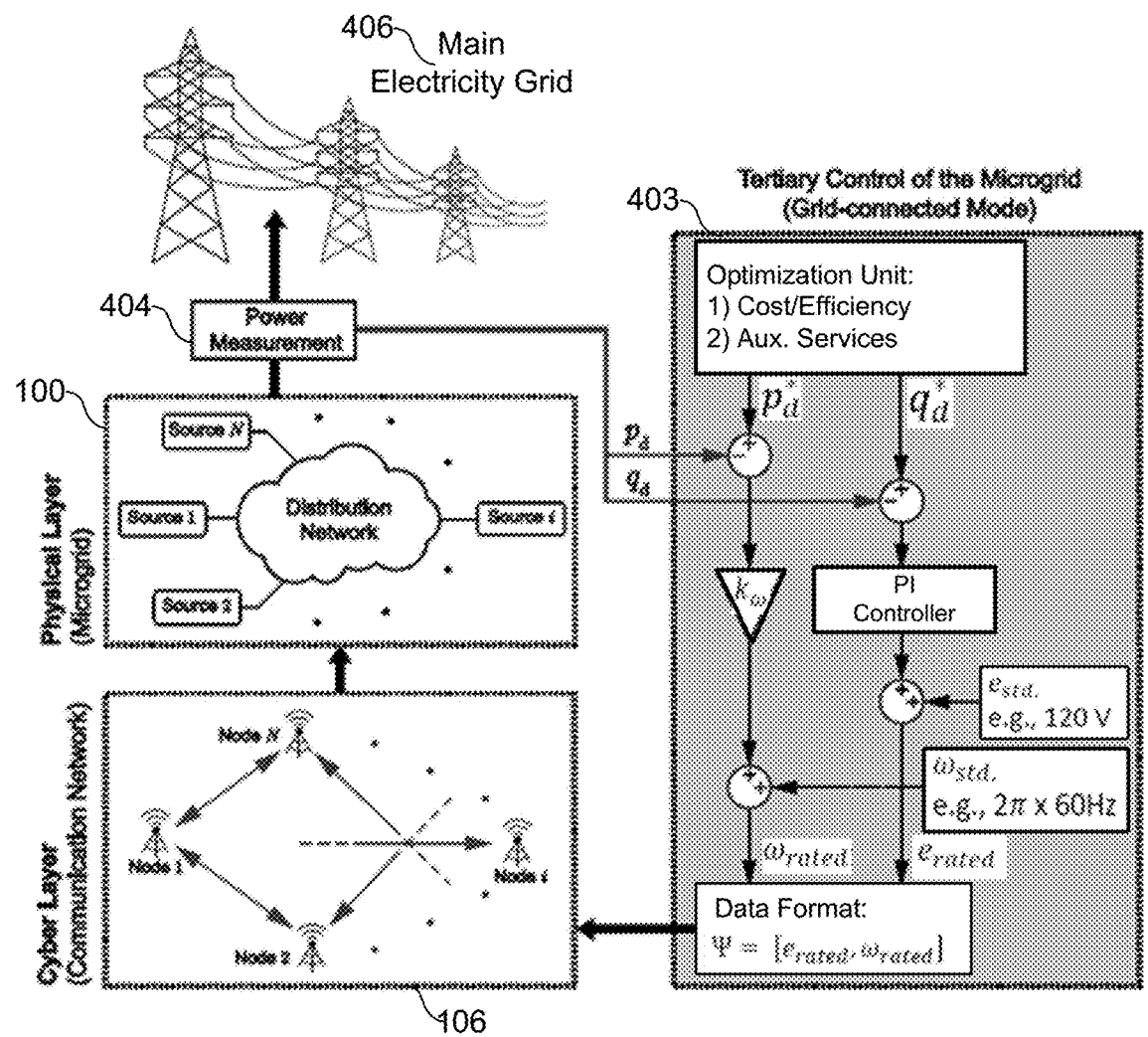
FIG. 4 is a system diagram of an example of the electrical power network of FIG. 1A attached to a main electrical network via a tertiary control unit according to various embodiments of the present disclosure.

Moving on to FIG. 4, shown is an electrical power network 100 including a tertiary control unit 403 and connected to another electricity grid 406 according to various embodiments of the present disclosure. In the embodiment of islanded mode of the electrical power network 100, the system operational autonomy requires preset (fixed) values for the rated voltage magnitude and frequency, $e_{rated}$ and $w_{rated}$, in all controllers 209. The voltage and frequency settings typically follow the standard ratings of the nearby other electricity grid. To further extend operational range of the controller 209 to the grid-connected mode, adjustable voltage magnitude and frequency ratings are considered. A tertiary control unit 403 fine-tunes such ratings when connecting to the other electricity grid 406 and/or other electrical power network 100.

In this embodiment, there is a single tertiary control unit 403 for the entire electrical power network 100. The tertiary control unit 403 can use the same communication network 106 as the local controllers 209, to propagate updated voltage and frequency ratings to all the controllers 209 across the electrical power network 100. The tertiary control unit 403 runs cost/efficiency optimization to determine the desired active and reactive powers to be exchanged between the electrical power network 100 and the main electricity grid 406, $p_d^*$ and $q_d^*$, respectively. The optimization scenarios can also account for auxiliary services such as, for example, frequency regulation, reactive power support, and/or other type of auxiliary service. The power flow between the electrical power network 100 and the other electricity grid 406 can be bidirectional and, thus, the desired powers $p_d^*$ and $q_d^*$ can be either positive or negative. In some embodiments, the power flow can be determined via a power measurement unit 404.

The tertiary control unit 403 compares the actual powers supplied to the other electricity grid 406, $p_d^*$ and $q_d^*$, with the desired values and, accordingly, updates voltage and frequency ratings sent to the controllers 209 of the electrical power network 100. In various embodiments, the steady-state rated voltage assignment, $e_{rated}$, may have slight deviation from the standard value, however, the steady-state value of the rated frequency, $w_{rated}$, will always converge to the standard value (e.g., 60 Hz in the North America). In some embodiments, the transient variations in the rated frequency adjust the phase angles across the electrical power network 100 and manage the active power flow.

Figure 5:
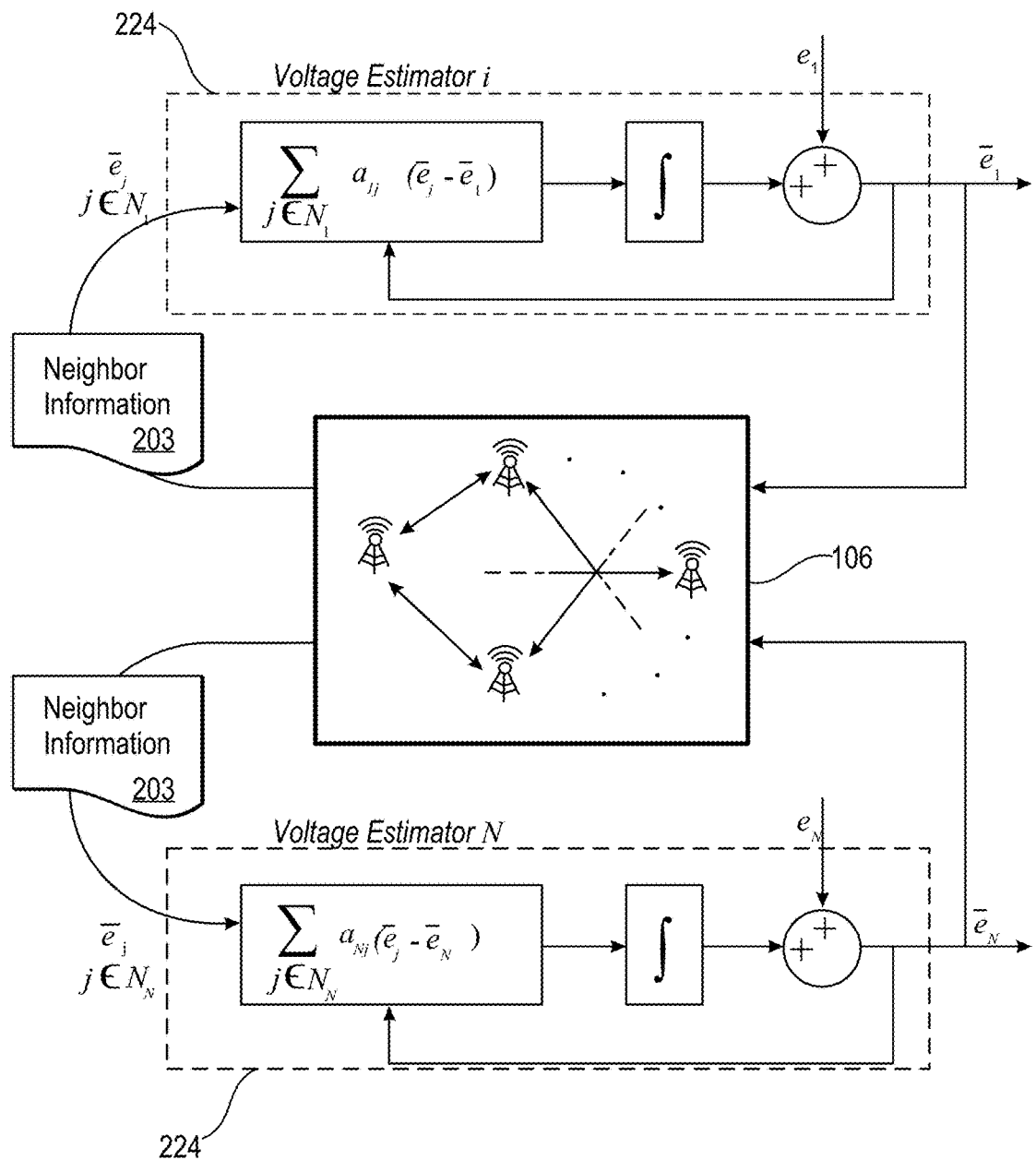
FIG. 5 is a diagram of an example of a voltage estimation policy of the controller within the electrical power network of FIG. 1A according to various embodiments of the present disclosure.

For the voltage regulation in the embodiments of FIG. 4, each node 112 may have a voltage estimator 224 (see FIG. 2) that develops the estimation of the averaged voltage magnitude across the electrical power network 100, (e.g, $\bar{e}_i$, for Node i), and exchanges this estimation with its neighbor nodes 112. A voltage estimation policy, according to various embodiments of the present disclosure is demonstrated in FIG. 5.

Accordingly, the voltage estimator 224 at Node i updates its own output, $\bar{e}_i$, by processing the neighbor information 203 including the neighbor node estimates, $\bar{e}_j s (j \in N_i)$ $\bar{e}_j s$ $(j \in N_i)$, and the local voltage measurement, $e_i$, $$\bar{e}_i(t) = e_i(t) + \int_0^t \sum_{j \in N_i} a_{ij}(\bar{e}_j(\tau) - \bar{e}_i(\tau))d\tau \qquad (8)$$

This updating policy is known as the dynamic consensus protocol. As seen in Equation (8), the local measurement, (e.g., $e_i$) is directly fed into the estimation protocol. Thus, in case of any voltage variation at Node i 112i, the local estimate, $\bar{e}_i$, immediately responds. The change in $\bar{e}_i$ propagates through the communication network 106 and affects all other estimations. If $e=[e_1, e_2, \ldots, e_N]^T$ and $\bar{e}=[\bar{e}_1, \bar{e}_2, \ldots, \bar{e}_N]^T$ are the measured voltage and the estimated average voltage vectors, respectively. E and $\bar{E}$ are the Laplace transforms of e and $\bar{e}$, respectively. Accordingly, global dynamic response of the estimation policy may be formulated as $$\bar{E} = s(sI_N + L)^{-1}E = H_{est}E \qquad (9)$$

where $I_N \in \mathbb{R}^{N \times N}$, L, and $H_{est}$ are the identity, Laplacian, and the estimator transfer-function matrices, respectively. If the communication graph 106 has a spanning tree with a balanced Laplacian matrix, L, then, all elements of s converge to a consensus value, which is the true average voltage, i.e., the average of all elements in e. Equivalently, $$\bar{e}^{ss} = Me^{ss} = \mathbb{R} \, e^{ss} \rangle \underline{1} \qquad (10)$$

where $M \in \mathbb{R}^{N \times N}$ is the averaging matrix, whose elements are all 1/N. $x^{ss}$ expresses the steady-state value of the vector $x \in \mathbb{R}^{N \times 1}$. $\langle x \rangle$ is a scalar that represents the average of all elements in the vector x. $\underline{1} \in \mathbb{R}^{N \times 1}$ is a column vector whose elements are all one.

System-Level Modeling

System-level modeling relates to the dynamic/static response of the entire electrical power network 100 with the controller 209 in effect. As shown in FIGS. 1A and 1B, the electrical power network 100 encompasses interactive cyber and physical subsystems (e.g., the physical layer 103 (FIG. 1A) and the communication layer 106 (FIGS. 1A and 1B)). The communication graph topology defines the interaction among controllers 209, the functionality of the controllers 209 determines output characteristics of the sources 206, and the transmission/distribution network 109 rules the physical interaction among sources 206 and loads 703 (see FIG. 7). Thus, a system-level study involves the mathematical modeling of each of the subsystems and establishment of mathematical coupling between the interactive subsystems.

Dispatchable sources 206 (FIG. 2), transmission lines 107 (FIG. 1A), and loads 703 form the physical layer 103 of the electrical power network 100 according to various embodiments of the present disclosure. Referring back to FIG. 1A, the physical layer 103 is shown where, in some embodiments, source nodes 112 can be considered as controllable voltage source inverters. The controller 209 (FIG. 2) of the present disclosure determines the voltage set points (both magnitude, $e_i^*$, and phase, $\delta_i^*$) for each source inverter 212 by processing the supplied active and reactive powers. The controller 209 acts on the physical layer 103, which is a multi-input/multi-output plant with the voltage set points as the inputs and the supplied active and reactive powers as the outputs. The output variables (i.e., the supplied powers) are expressed in terms of the input variables (i.e., the voltage set points).

FIG. 1A helps to formulate the supplied current of each source node 112. By formulating the supplied current by Node i, $$I_i = Y_{ii} V_i + \sum_{j=1(\neq i)}^{N} Y_{ij}(V_i - V_j) \quad (11)$$

where $I_i$ and $V_i$ are the phasor representation of the supplied current and phase voltage of the Node i, respectively. $Y_{ii}$ and $Y_{ij}$ and are the local load admittance at Bus i (Node i) 107 and the admittance of the transmission line connecting busses i and j, respectively. With no loss of generality, the distribution network is assumed reduced (e.g., by using Kron reduction) such that all non-generating busses are removed from the network. Thus, the complex power delivered by the Node i is, $$s_i = 3 V_i I_i^* \quad (12)$$

$$= 3 [V_i]^2 \sum_{j=1}^{N} Y_{ij}^* - 3 \sum_{j=1(\neq i)}^{N} V_i V_j V_{ij}^*$$

Assume $V_i = e_i \angle \delta_i$ and $Y_{ij} = y_{ij} \angle \theta_{ij}$ where $e_i$, $y_{ij}$, $\delta_i$ and $\theta_{ij}$ are the magnitude of $V_i$, magnitude of $Y_{ij}$, phase of $V_i$, and phase of $Y_{ij}$, respectively. $Y_{ij} = g_{ij} + j b_{ij}$ is the rectangular representation of the admittance $Y_{ij}$. One can use Equation (12) to derive the active and reactive powers delivered by Node i ($p_i$ and $q_i$, respectively), $$p_i = 3 e_i^2 \sum_{j=1}^{N} g_{ij} - 3 \sum_{j=1(\neq i)}^{N} e_i e_j y_{ij} \cos(\delta_i - \delta_j - \theta_{ij}) \quad (13)$$

$$q_i = -3 e_i^2 \sum_{j=1}^{N} b_{ij} - 3 \sum_{j=1(\neq i)}^{N} e_i e_j y_{ij} \sin(\delta_i - \delta_j - \theta_{ij}) \quad (14)$$

The secondary control typically acts slower than the dynamic of the electrical power network 100 (e.g., microgrid), as its objectives are voltage and power regulation in the steady state. Accordingly, one can safely neglect the fast dynamic transient responses of the microgrid and use the phasor analysis in Equations (13) and (14) to model the power flow. Equations (13) and (14) express nonlinear relationships between the voltages and supplied powers. In time domain, any variable x can be represented as $x = x^q + \hat{x}$ where $x^q$ and $\hat{x}$ are the quiescent and small-signal perturbation parts, respectively. Thus, one can write, $$p_i = p_i^q + \hat{p}_i \quad (15)$$

$$= p_i^q + \sum_{j=1}^{N} \frac{\partial p_i}{\partial e_j} \hat{e}_j + \sum_{j=1}^{N} \frac{\partial p_i}{\partial \delta_j} \hat{\delta}_j \Rightarrow$$

$$\hat{p}_i = \sum_{j=1}^{N} k_{e,ij}^p \hat{e}_j + \sum_{j=1}^{N} k_{\delta,ij}^p \hat{\delta}_j$$

$$q_i = q_i^q + \hat{q}_i \quad (16)$$

$$= q_i^q + \sum_{j=1}^{N} \frac{\partial q_i}{\partial e_j} \hat{e}_j + \sum_{j=1}^{N} \frac{\partial q_i}{\partial \delta_j} \hat{\delta}_j \Rightarrow$$

$$\hat{q}_i = \sum_{j=1}^{N} k_{e,ij}^q \hat{e}_j + \sum_{j=1}^{N} k_{\delta,ij}^q \hat{\delta}_j$$

where the coefficients in Equations (15) and (16) are formulated, $$k_{e,ii}^p = \frac{p_i^q}{e_i^q} + 3 e_i^q \sum_{j=1}^{N} g_{ij} \quad (17)$$

$$k_{e,ij}^p = -3 e_i^q y_{ij} \cos(\delta_i^q - \delta_j^q - \theta_{ij}), \; j \neq i \quad (18)$$

$$k_{\delta,ii}^p = 3 \sum_{j=1(\neq i)}^{N} e_i^q e_j^q y_{ij} \sin(\delta_i^q - \delta_j^q - \theta_{ij}) \quad (19)$$

$$= -q_i^q - 3 e_i^2 \sum_{j=1}^{N} b_{ij}$$

$$k_{\delta,ij}^p = -3 e_i^q e_j^q y_{ij} \sin(\delta_i^q - \delta_j^q - \theta_{ij}), \; j \neq i \quad (20)$$

$$k_{e,ii}^q = \frac{q_i^q}{e_i^q} - 3 e_i^q \sum_{j=1}^{N} b_{ij} \quad (21)$$

$$k_{\delta,ij}^q = -3 e_i^q y_{ij} \sin(\delta_i^q - \delta_j^q - \theta_{ij}), \; j \neq i \quad (22)$$

$$k_{\delta,ii}^q = -3 \sum_{j=1(\neq i)}^{N} e_i^q e_j^q y_{ij} \cos(\delta_i^q - \delta_j^q - \theta_{ij}) \quad (23)$$

$$= p_i^q - 3 e_i^2 \sum_{j=1}^{N} g_{ij}$$

-continued $$k_{\hat{e},ij}^q = 3e_i^q e_j^q y_{ij} \cos(\delta_i^q - \delta_i^q - \theta_{ij}), j \neq i \quad (24)$$

Equations (15)-(24) explain how a disturbance in any of the voltage magnitudes, $\hat{e}_i$s, or phases, $\hat{\delta}_i$s, affects the power flow in the entire electrical power network 100. These equations can be represented in the matrix format, $$\hat{p} = k_e^p \hat{e} + k_\delta^p \hat{\delta} \quad (25)$$

$$\hat{q} = k_e^q \hat{e} + k_\delta^q \hat{\delta} \quad (26)$$

where $\hat{p} = [\hat{p}_1, \hat{p}_2, \ldots, \hat{p}_N]^T$, $\hat{q} = [\hat{q}_1, \hat{q}_2, \ldots, \hat{q}_N]^T$, $\hat{e} = [\hat{e}_1, \hat{e}_2, \ldots, \hat{e}_N]^T$, and $\hat{\delta} = [\hat{\delta}_1, \hat{\delta}_2, \ldots, \hat{\delta}_N]^T$ are column vectors carrying small-signal portions of the active powers, reactive powers, voltage magnitudes, and voltage phases, respectively. $k_e^p = [k_{e,ij}^p]$, $k_\delta^p = [k_{\delta,ij}^p]$, $k_e^q = [k_{e,ij}^q]$, $k_\delta^q = [k_{\delta,ij}^q]$ are all matrices in $\mathbb{R}^{N \times N}$ that contain coefficients in Equations (17)-(24). $k_\delta^p$ and $k_e^q$ are referred to here as the p-$\delta$ and q-e transfer matrices, respectively.

Referring back to FIG. 2, the communication network 106 (i.e., cyber domain) is where the controllers 209 exchange information 203 (e.g., measurements), process information 203 and, update the voltage set points. The voltage regulators 215 and reactive power regulators 218 cooperate to adjust the voltage magnitude set points, $e_i^*$. In the frequency domain, $$G_i(s)(E_{rated} - \bar{E}_i) = \Delta E_i^1 \quad (27)$$

$$H_i(s)\left(\sum_{j \in N_i} ba_{ij}(Q_j^{norm} - Q_i^{norm})\right) = \Delta E_i^2 \quad (28)$$

$$E_{rated} + \Delta E_i^1 + \Delta E_i^2 = E_i^* \quad (29)$$

where $E_{rated}$, $\bar{E}_i$, $\Delta E_i^1$, $Q_i^{norm}$, $\Delta E_i^2$, and $E_i^*$ are the Laplace transforms of $e_{rated}$, $\bar{e}_i$, $\delta e_i^1$, $q_i^{norm}$, $\delta e_i^2$, and $e_i^*$, respectively. Equations (27)-(29) can be represented in the matrix format, $$G(E_{rated}-\bar{E}) = G(E_{rated}-H_{est}E) = \Delta E^1 \quad (30)$$

$$-bHLQ^{norm} = -bHLq_{rated}^{-1}Q = \Delta E^2 \quad (31)$$

$$E_{rated} + \Delta E^1 + \Delta E^2 = E^* \quad (32)$$

where $G = \text{diag}\{G_i\}$ and $H = \text{diag}\{H_i\}$ are diagonal matrices containing voltage and reactive power controllers, respectively. G and H are referred to as the voltage-controller and Q-controller matrices, respectively. $q_{rated} = \text{diag}\{q_r^{rated}\}$ is a diagonal matrix that carries the rated reactive powers of the sources. $E_{rated} = E_{rated}\underline{1}$, $\Delta E^1 = [\Delta E_1^1, \Delta E_2^1, \ldots, \Delta E_N^1]^T$, $\Delta E^2 = [\Delta E_1^2, \Delta E_2^1, \ldots, \Delta E_N^2]^T$, $E^* = [E_1^*, E_2^*, \ldots, E_N^*]^T$, and $Q^{norm} = [Q_1^{norm}, Q_2^{norm}, \ldots, Q_N^{norm}]^T$ are column vectors carrying control variables.

It is assumed that for t<0 all source nodes 112 of the electrical power network 100 operate with identical voltage set points, i.e., for all $1 \leq i \leq N$, $e_i^* = e_{rated}$ and $w_i^* = w_{rated}$ and thus, $v_i(t) = e_{rated} \sin(w_{rated}t)$. The controller 209 is activated at t=0 such that the quiescent value of any variable x, $x^q$, represents its steady-state value for t<0, i.e., before activating the controller 209, and the small-signal part, $\hat{x}$, captures the variable response to the controller activation for t>0. Therefore, $\delta e^{1,q} = [\delta e_1^{1,q}, \delta e_2^{1,q}, \ldots, \delta e_N^{1,q}]^T = 0$, $\delta e^{2,q} = [\delta e_1^{2,q}, \delta e_2^{2,q}, \ldots, \delta e_N^{2,q}]^T = 0$, and $e_{rated}^q = e_{rated}\underline{1}$ $e_{rated}^q = e_{rated}\underline{1}$ and, accordingly, simplify Equations (30) and (31), $$G(\hat{E}_{rated} - H_{est}\hat{E}) = \Delta \hat{E}^1 \quad (33)$$

$$-bHLq_{rated}^{-1}\left(\frac{q^q}{s} + \hat{Q}\right) = \Delta \hat{E}^2 \quad (34)$$

where $q = [q_1^q, q_2^q, \ldots, q_N^q]^T$ carries the reactive powers supplied by individual sources for t<0. Since the rated voltage does not change before and after activating the controller 209, $\hat{E}_{rated}$0. The voltage set points dynamics can now be found by substituting Equations (33)-(34) into Equation (32), $$\hat{E}^* = -GH_{est}\hat{E} - bHL_{q_{rated}^{-1}}\left(\frac{q^q}{s} + \hat{Q}\right). \quad (35)$$

As seen, Equation (35) has two terms. The first term, $-GH_{est}\hat{E}$, represents the effort of the controller 209 to achieve the global voltage regulation, and, the second term, $-bHLQ_{rated}^{-1}(q^q/s+\hat{Q})$, explains how the controller 209 balances reactive load sharing across the electrical power network 100.

Active power regulators 221 (FIG. 2) adjust the active power flow by tuning the phase angles. The controller 209 at each node 112, e.g., Node i, compares the local normalized active power with those of the predefined neighbor nodes 112 and, accordingly, updates the phase angle set point as in Equation (7). Controller activation at t=0 implies that $\omega_i^*(t<0) = \omega_{rated}$ and, thus, $\delta_i^q = \delta_i^{ss}(t<0) = 0$. Accordingly, $$\hat{\delta}_i^*(t \geq 0) = \int_0^t \sum_{j \in N_i} ca_{ij}(p_j^{norm} - p_i^{norm})d\tau \quad (36)$$

Equivalently, in the frequency domain, $$\hat{\Delta}_i^* = \frac{1}{s}\left(\sum_{j \in N_i} ca_{ij}(P_j^{norm} - P_i^{norm})\right) \quad (37)$$

where $\hat{\Delta}_i^*$ is the Laplace transform of $\delta_i^*$. Equation (37) in matrix format, $$\hat{\Delta}^* = -\frac{c}{s} Lp_{rated}^{-1} P \quad (38)$$

$$= -\frac{c}{s} Lp_{rated}^{-1}\left(\frac{p^q}{s} + \hat{P}\right)$$

where $\hat{\Delta}^* = [\hat{\Delta}_1^*, \hat{\Delta}_2^*, \ldots, \hat{\Delta}_N^*]^T$ and $p_{rated} = \text{diag}\{p_i^{rated}\}$ is a diagonal matrix that includes the rated active powers of the sources. $p_q = [p_1^q, 2, \ldots, p_N^q]^T$ carries the active powers supplied by individual sources 206 before activation of the controller 209. Equation (38) represents the phase angles dynamic response to mitigate and, eventually, eliminate the active load sharing mismatch.

Figure 6:
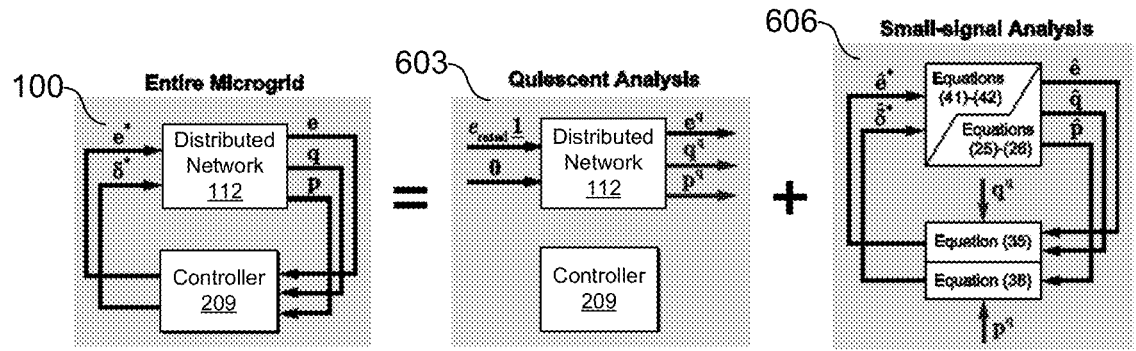
FIG. 6 is a model diagram of an example of the electrical power network of FIG. 1A according to various embodiments of the present disclosure.

Referring next to FIG. 6, shown is a model diagram of an example of the entire electrical power network 100 according to various embodiments of the present disclosure. FIG. 6 illustrates the electrical power network 100 separated into a quiescent model 603 and a small-signal model 606. The entire system in the small-signal model 606 can be treated as a multi-input/multi-output plant, where $p^q$/s and $q^q$/s are the inputs and $\hat{E}$, $\hat{P}$, and $\hat{Q}$ are the outputs. Equations (35) and (38) show how the controller 209 adjusts the voltage set points by processing the load sharing mismatches. Accordingly, for the inverter 212 driving Node i, $$\hat{\Delta}_i = G_i^{\Delta} \hat{\Delta}_i^* \quad (39)$$

$$\hat{E}_i = G_i^E \hat{E}_i^* \quad (40)$$

where $G_i^E$ and $G_i^{\Delta}$ are the magnitude and phase transfer functions, respectively. Each inverter accommodates an output filter to eliminate the switching harmonics, whose dynamic is included in the transfer functions $G_i^E$ and $G_i^{\Delta}$. Equivalently, in the matrix format, $$\hat{\Delta} = G^{\Delta} \hat{\Delta}^* \quad (41)$$

$$\hat{E} = G^E \hat{E}^* \quad (42)$$

where $G^E = \text{diag}\{G_i^E\}$ and $G^{\Delta} = \text{diag}\{G_i^{\Delta}\}$ are diagonal matrices of the inverter transfer functions. The entire system can be formulated by substituting Equations (35) and (38) in Equations (25) and (26), and also using Equations (41) and (42).

The transmission/distribution network is assumed to be predominantly inductive and, thus, The active and reactive powers are mainly controlled by adjusting the voltage phases and magnitudes since the transmission/distribution network 109 is predominately inductive. Accordingly, in Equations (25) and (26), $k_e^P \cong 0$ and $k_{\delta}^q \cong 0$, respectively, which helps to find the reduced-order dynamic model of the entire system. Substituting Equation (41) in Equation (38) and Equation (42) in Equation (35) yields $$(G^{\Delta})^{-1} \hat{\Delta} = -\frac{c}{s} L p_{rated}^{-1} \left( \frac{p^q}{s} + \hat{P} \right) \quad (43)$$

$$((G^E)^{-1} + G H_{est}) \hat{E} = -b H L q_{rated}^{-1} \left( \frac{q^q}{s} + \hat{Q} \right). \quad (44)$$

Substituting the reduced form of Equations (25) and (26) in Equations (43) and (44) yields $$\hat{P} = -T_P L p_{rated}^{-1} \frac{p^q}{s} \quad (45)$$

$$\hat{Q} = -T_Q L q_{rated}^{-1} \frac{q^q}{s} \quad (46)$$

where, $T_P$ and $T_Q$ are the P-balancing and Q-balancing matrices, and are defied as, $$T_P \triangleq (s(ck_{\delta}^P G^{\Delta})^{-1} + L p_{rated}^{-1})^{-1} \quad (47)$$

$$T_Q \triangleq ((bk_e^q G^E H)^{-1} + b^{-1} H^{-1} G H_{est}(k_e^q)^{-1} + L q_{rated}^{-1})^{-1}. \quad (48)$$

Equations (43) through (48) describe dynamic response of the entire electronic power network 100 with the controller 209 in effect. Equations (45) and (46) describe that if the power (either active or reactive) was proportionally shared prior to activating the controller 209, i.e., $p_{rated}^{-1} p^q = n\underline{1}$ or $q_{rated}^{-1} q^q = m\underline{1}$, the power flow would remain intact after activation of the controller 209, i.e., $\hat{p}=0$ or $\hat{q}=0$.

Controller Design

In various embodiments of the present disclosure, converter transfer function matrices, $G^{\Delta}$ and $G^E$, rated active and reactive matrices, $p_{rated}$ and $q_{rated}$, respectively, and p–$\delta$ and q–e transfer matrices, $k_{\delta}^P$ and $k_e^q$, respectively, are predefined for the electronic power network 100. In various embodiments, the communication networks 106 for exchanging information and defining neighbor nodes 112 comprises a sparse graph with 1) at least a spanning tree, 2) balanced Laplacian matrix, and 3) minimum communication redundancy. Communication weights of the graph, $a_{ij}$, and, thus, the Laplacian matrix, L, directly determine the voltage estimator dynamic, $H_{est}$.

In some embodiments, the controller matrices $G = \text{diag}\{G_i\}$ and $H = \text{diag}\{H_i\}$ and the coupling gain b may be adjusted by evaluating Equation (48) to place all poles of $T_Q$ in the Open Left Hand Plane (OLHP). Smaller gains help to stabilize the entire electrical power network 100 while larger gains provide a faster dynamic response. In some embodiments, the parameters can be predefined based in part on at least one of stability, settling time, and/or other factors. In some embodiments, the estimator dynamic is faster than the dynamics of the electrical power network 100. Therefore, evaluating Equation (48), $H_{est} \cong M$ can be assumed. In some embodiments, the switching frequency of the inverter 212 can be suitable to provide a prompt response to the voltage command, i.e., $G^E \cong I_N$.

Referring back to FIG. 2, the voltage regulator 215 and the reactive power regulator 218, adjust the voltage magnitude, $e_i^*$, by generating two voltage correction terms, $\delta e_i^1$ and $\delta e_i^2$, respectively. Since the voltage regulator 215 is tasked to maintain average voltage across the electrical power network 100 at the rated value, the speed of the voltage regulator 215 can ensure voltage stability/regulation. In some embodiments, the voltage control loops (e.g., voltage estimator 224, PI controller 233, voltage measurement filters, etc.) can be designed for a bandwidth higher to the reactive power control loops (e.g., PI controller 227, reactive power measurement filters, etc.). In some embodiments, the voltage measurement filters can remove the switching harmonics and filter out much lower frequency terms of the line-frequency harmonics and other contents caused by load nonlinearity or unbalance. In such embodiments, the power measurement process and the overall active/reactive load sharing control loops are slowed down. In some embodiments, the reactive power PI controller, $H_i$, 227 can be slower than the voltage PI controller, $G_i$, 233.

Equations (45) and (47) provide dynamic response of the active load sharing mechanism. Given the fast response of the inverter 212, $G^{\Delta} \cong I_N$ can be assumed, which simplifies Equation (47). In some embodiments, the coupling gain c can be sweeped and the stability and dynamic response through Equation (47) can be assessed to find an appropriate choice for c.

Steady-State Performance Analysis

A performance analysis of the electrical power network 100 investigates load sharing and voltage regulation quality in the steady state. Voltage regulation and reactive load sharing is first to study. In the steady state, the voltage estimators 215 converge to the true average voltage of the electrical power network 100. Equivalently, $\bar{e}^{ss} = Me^{ss} = \langle e^{ss} \rangle \underline{1}$. Thus, based on the various embodiments of FIG. 2

$$\begin{cases} \delta e^1 = \delta e_0^1 + (G_p + G_1(t-t_0))(e_{rated}\underline{1} - Me^{ss}) \\ \delta e^2 = \delta e_0^2 + (H_p + H_1(t-t_0))(-bLq_{rated}^{-1}q^{ss}) \end{cases} \quad (49)$$

where $\delta e_0^1$ and $\delta e_0^2$ are column vectors that carry the integrator outputs in $G_i$s and $H_i$s at $t=t_0$, respectively. Accordingly, $$e^{*ss} = e_{rated} + \delta e^1 \delta e^2 = e_{rated}\underline{1} + \delta e_0^1 + \delta e_0^2 +$$
$$G_P(e_{rated} - \langle e^{ss}\rangle) - bH_P Lq_{rated}^{-1} q^{ss} + (G_I(e_{rated} - \langle e^{ss}\rangle)\underline{1} - bH_I Lq_{rated}^{-1} q^{ss})(t-t_0) \quad (50)$$

where $G_I$ and $G_P$ are the diagonal matrices carrying the integral and proportional gains of the voltage-controller matrix G such that $G_P + G_I/s = G$. Similarly, $H_I$ and $H_P$ are the diagonal matrices carrying the integral and proportional gains of the Q-controller matrix H. Equation (50) holds for all $t \geq t_0$, and provides a constant voltage set point vector, $e^{*ss}$. Thus, the time-varying part of Equation (50) is zero or, equivalently, $$(e_{rated} - \langle e^{ss}\rangle)U = Lq_{rated}^{-1} q^{ss} \quad (51)$$

where $U = b^{-1} G_I H_I^{-1} = \text{diag}\{u_i\}$ is a diagonal matrix. Multiplying both sides of Equation (51) from the left by $\underline{1}^T$, $$(e_{rated} - \langle e^{ss}\rangle)\underline{1}^T U = \underline{1}^T Lq_{rated}^{-1} q^{ss} \quad (52)$$

Given the balanced Laplacian matrix, $\underline{1}^T L = 0$, which simplifies Equation (52), $$(e_{rated} - \langle e^{ss}\rangle)\sum_{i=1}^{N} u_i = 0. \quad (53)$$

Since all entries of the matrix U are positive, Equation (53) yields $e_{rated} = \langle e^{ss}\rangle$, which implies that the controllers successfully regulates the averaged voltage magnitude of the microgrid, $\langle e^{ss}\rangle$, at the rated value, $e_{rated}$. Moreover, by substituting $e_{rated} - \langle e^{ss}\rangle = 0$ in Equation (51), $$Lq_{rated}^{-1} q^{ss} = 0. \quad (54)$$

If L is the Laplacian matrix associated with a graph that contains a spanning tree, the only nonzero solution to $Lx=0$ is $x = n\underline{1}$, where n is any real number. Thus, Equation (54) implies $q^{ss} = nq_{rated}\underline{1}$, which assures that the controller 209 shares the total reactive load among the sources in proportion to their ratings.

Frequency regulation and active load sharing is the next to study. The controller 209 guarantees the convergence of the voltage magnitude vector, e, and phase angle vector, $\delta$ to steady-state values. Thus, Equations (6) and (7) suggest that all sources 206 would synchronize to the rated frequency, $\omega_{rated}$. Moreover, based on Equation (7), stabilizing the phase angles across the electronic power network 100 implies that all the frequency correction terms in Equation (4) should decay to zero. Equivalently, $$cLp_{rated}^{-1} p^{ss} = 0 \quad (55)$$

which offers, $p^{ss} = mp_{rated}\underline{1}$, where m is a positive real number. Thus, the controller 209 successfully handles the proportional active load sharing.

Experiments

Figure 7:
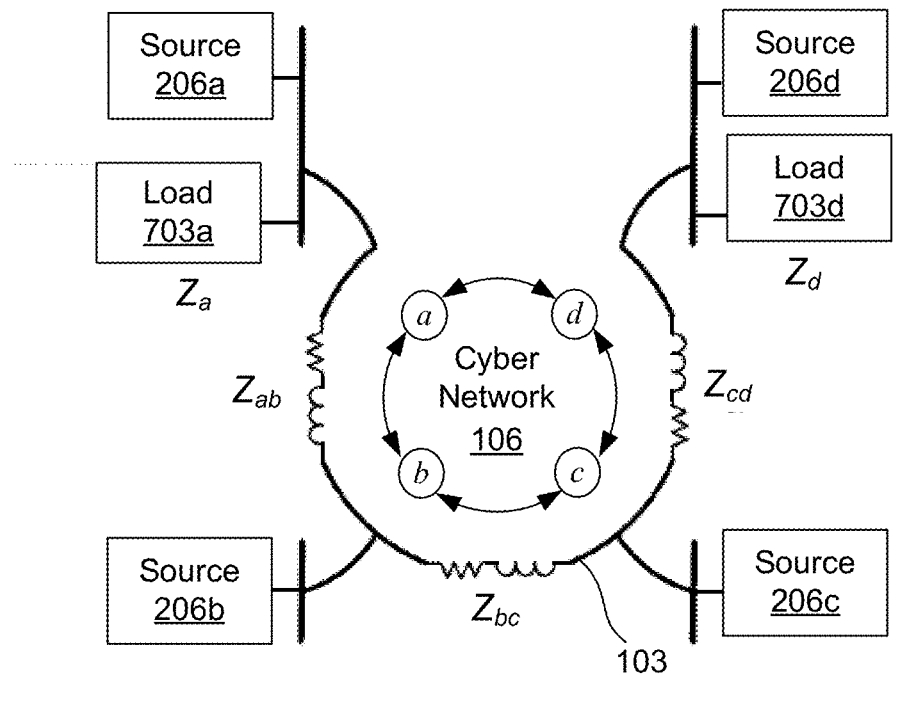
FIG. 7 is a schematic drawing of an example of the electrical power network of FIG. 1A according to various embodiments of the present disclosure.

FIG. 7 illustrates a schematic drawing of an example of an electrical power network 100 according to various embodiments of the present disclosure. The electrical power network 100 comprises four inverter-driven sources 206 placed in a radial connection to supply two loads 703 (e.g. 703a, 703b), $Z_1$ and $Z_4$. In one non-limiting example, assume that the inverters 212 (FIG. 2) of the sources 206 have similar topologies but different ratings, i.e., the ratings of the inverters 212 of sources 206a and 206b are twice those for the inverters 212 of sources 206c and 206d. Each inverter 212 is augmented with an LCL filter 230 (FIG. 2) to eliminate switching and line-frequency harmonics. For the given experiment, an RL-circuit model is used for each transmission line 107 (FIG. 1A).

In various embodiments, the controller 209 of the present disclosure is a general solution that can handle load sharing for variety of distribution networks 109, such as, for example, predominantly inductive networks, inductive-resistive networks, primarily resistive networks and/or any other appropriate type of network. For the given experiment, an inductive-resistive distribution network 109 is adopted to investigate collaborative interaction of the active and reactive power regulators in load sharing.

Structure of the communication network 106 is highlighted in FIG. 7. While the communication network of FIG. 7 comprises a ring structure, the communication network can be designed in other structures so long as the communication network 106 a sparse network that carries the required minimum redundancy where no single communication link failure would hinder the connectivity of the communication network 106. Communication links 115 are bidirectional to feature a balanced Laplacian matrix.

Performance Assessment

Figure 8A:
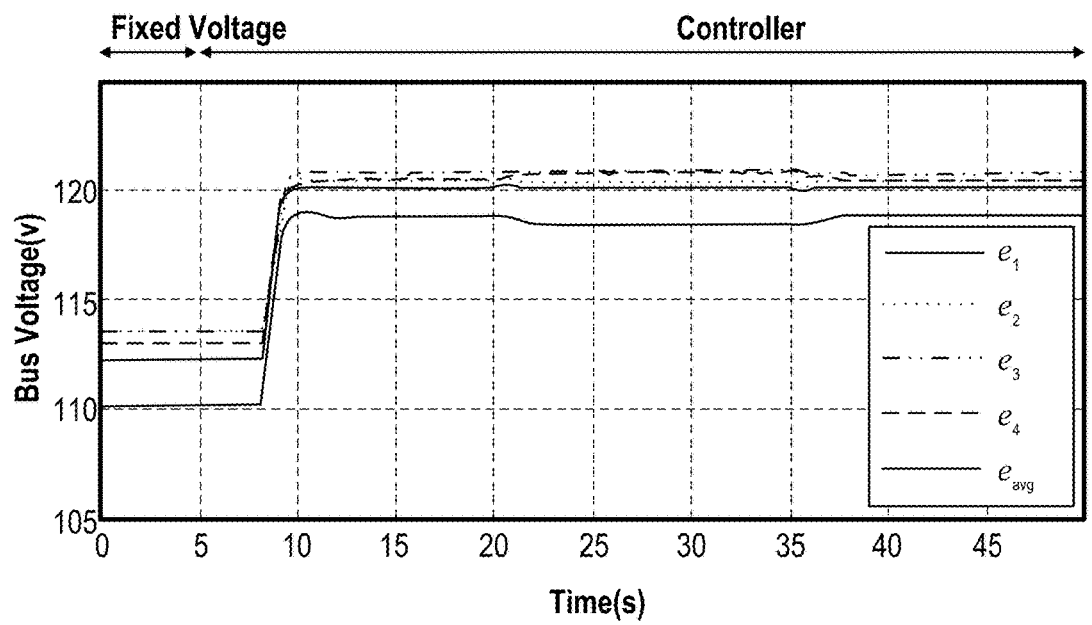
FIGS. 8A-8H illustrate graphical representations of performance of a controller of the electrical power network of FIG. 1A according to various embodiments of the present disclosure.
Figure 8B:
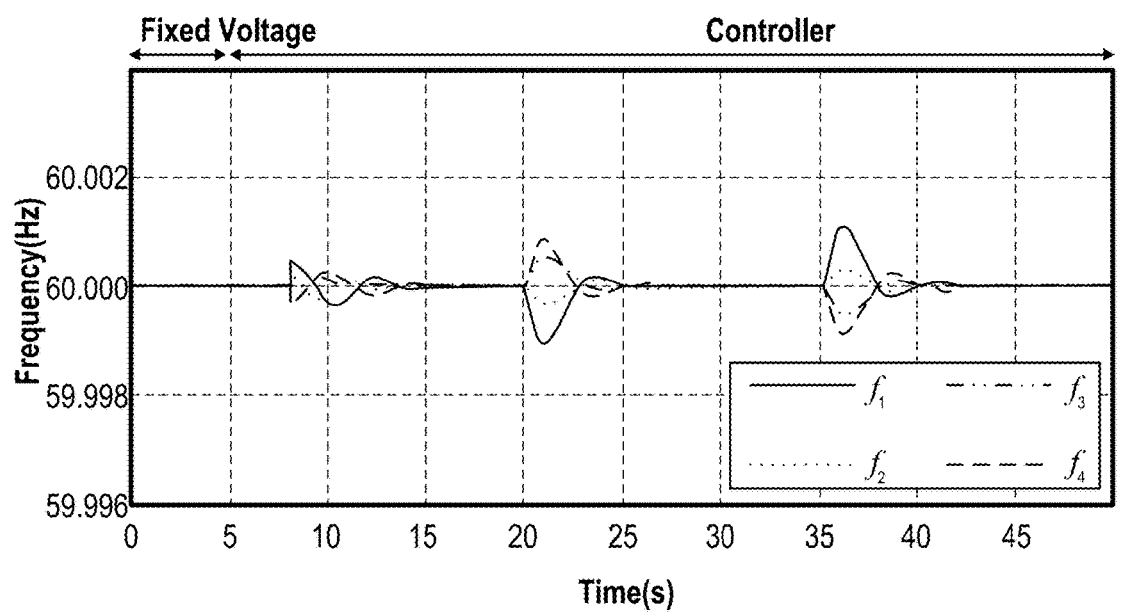
Figure 8C:
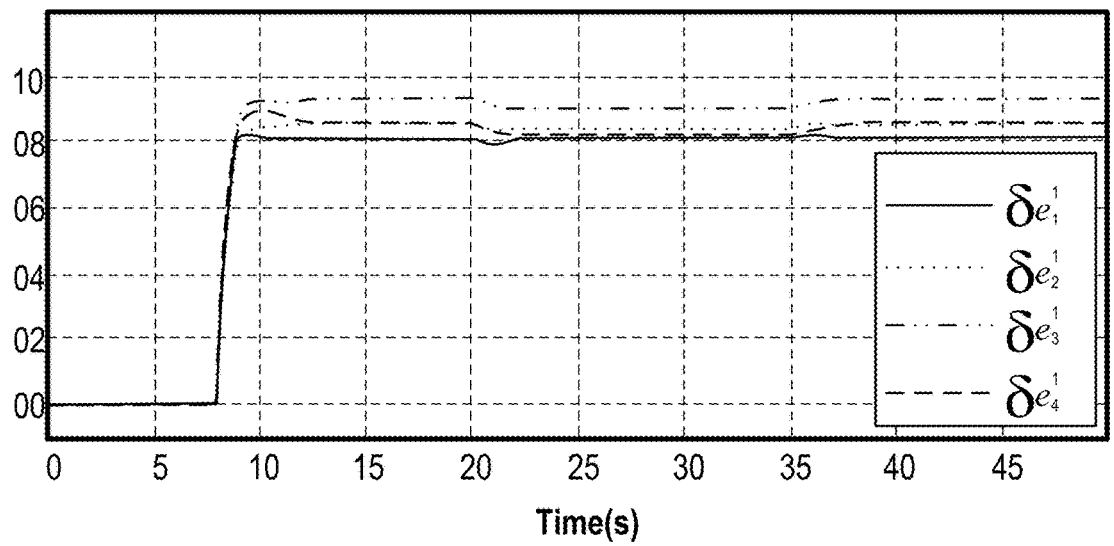
Figure 8D:
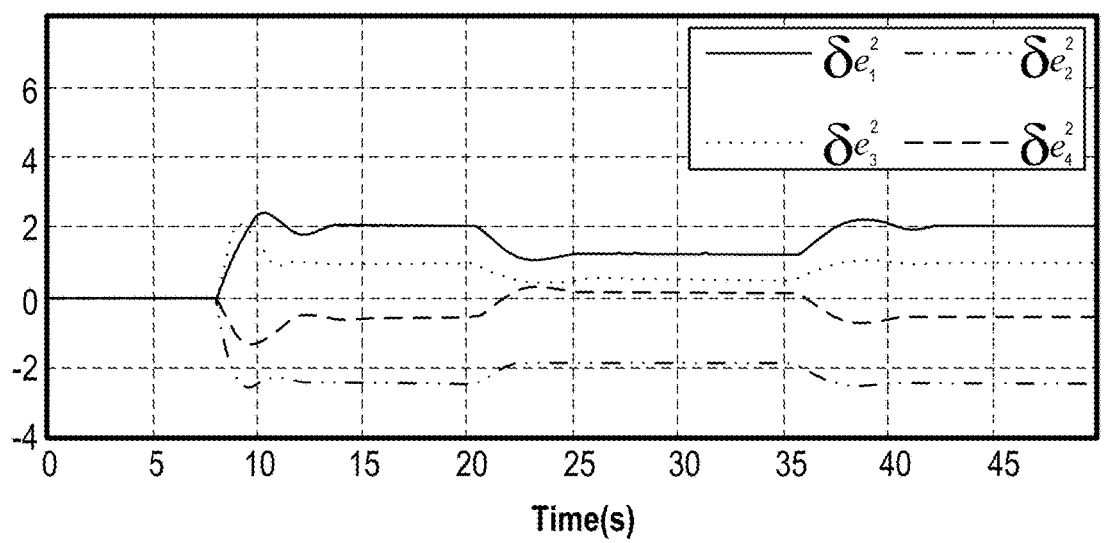
Figure 8E:
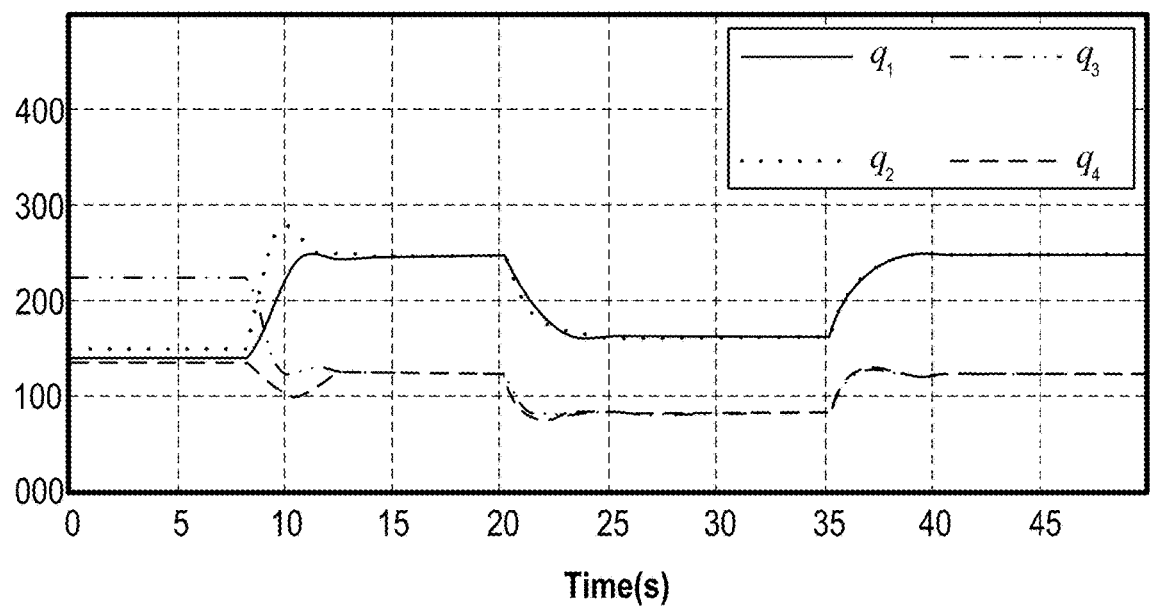
Figure 8F:
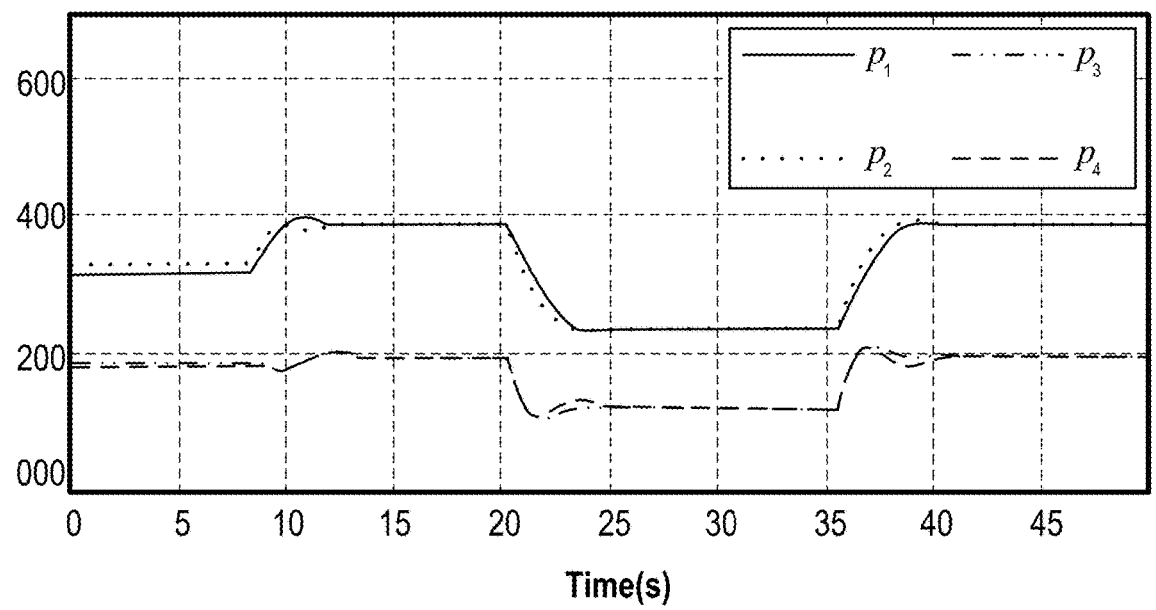

FIGS. 8A-8H illustrate examples of graphical representations of performance evaluations of the controller 209 of the electrical power network 100 during experimentation according to various embodiments of the present disclosure. In the experiment, the inverters 212 are initially driven with fixed voltage command, i.e., $e^* = 120$ V and $w^* = 120\pi$ rad/s. It should be noted that no voltage feedback control had been initially in action to compensate the voltage drop across the LCL filters 230 and, thus, the resulting bus voltages of FIG. 8A may be less than the desired set point, i.e., $e^* = 120$ V. FIGS. 8E and 8F illustrate that the total load is not shared among sources 206 in proportion to their rated power.

Assume that the voltage PI controllers, G, 233 are designed slightly faster than the reactive power PI controllers, $H_i$, 227. In the experiment, the cut-off frequencies of the power measurement filters are as low as 3 Hz to damp all undesired low-frequency harmonics. These design considerations set the dynamic responses of the two voltage and reactive power regulators apart enough to dynamically separate the two resulting voltage correction terms, i.e., $\delta e_i^1$ and $\delta e_i^2$. The controller 209 is activated at $t=8$ s. The voltage correction terms $\delta e_i^1$ and $\delta e_i^2$ have been added to the voltage set points to help with the global voltage regulation and reactive load sharing. FIG. 8A illustrates an example of the controllers 209 boosting the bus voltages across the electronic power network 100 to satisfy the global voltage regulation; i.e., for $t>8$ s, the average voltage across the electronic power network 100 is successfully regulated at the desired 120 V. As seen in FIGS. 8B and 8C, the first and the second voltage correction terms respond at two different time scales; the first correction term $\delta e_i^1$ (output of the voltage regulator 215) responds four times faster than the second correction term $\delta e_i^2$ (output of the reactive power regulator 218). FIG. 8B shows that the controllers 209 have varied the frequency set points in transients to adjust individual phase angles and provide the desired active load sharing. In the experiment, the active power regulator 221 is proven to only enforce transient deviations in frequency and that imposes no steady-state deviation. In the experiment, all inverter frequencies synchronize to the rated frequency of 60 Hz in the steady state. FIGS. 8E and 8F shot e filtered power measurements and explain how the controllers 209 have effectively rerouted the power flow to provide proportional load sharing. Individual and total reactive and active load demands are plotted in FIGS. 8G and 8H. The loads have drawn more power once the controller 209 is activated since the voltages are boosted across the entire electrical power network 100.

Figure 8G:
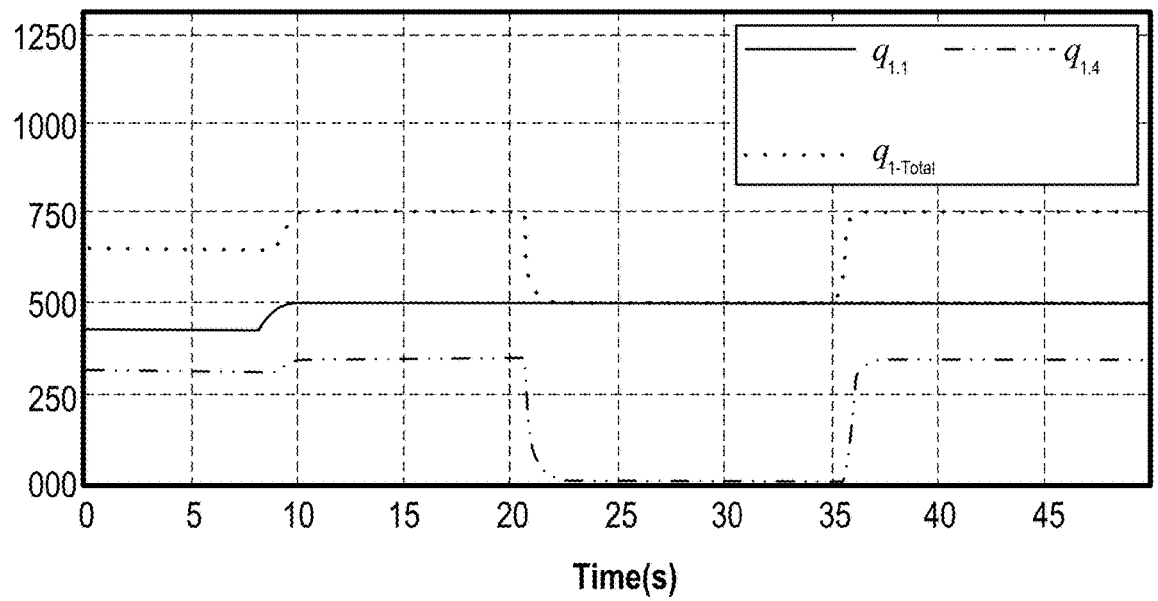
Figure 8H:
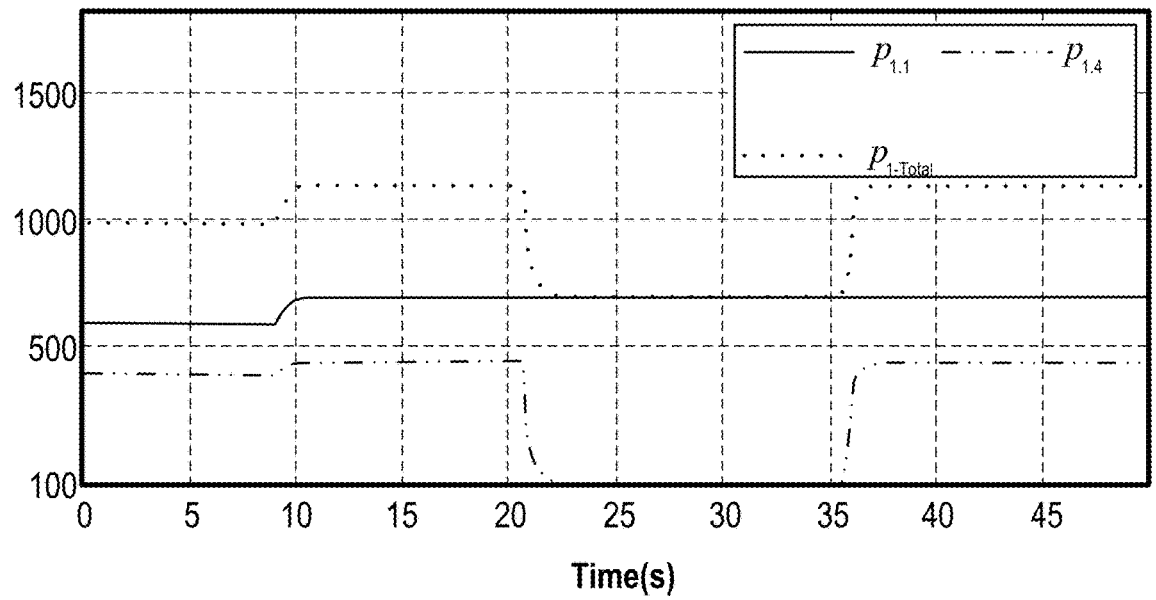

With respect to the controller performance in response to the load change, assume that the load at Bus d, $Z_4$, has been unplugged at t=20 s and plugged back in at t=35 s. As illustrated in FIGS. 8A-8H, the controller 209 has successfully maintained global voltage regulation, frequency synchronization, and proportional load sharing, despite the change in load. As shown in FIGS. 8E and 8F, the inverters 212 of Nodes c and d respond faster to the load change than the other two inverters 212 as they are in closer vicinity of Z. Soft load change is performed in this study for safety purposes. In fact, the load inductor at Bus d features an air-gap control knob. Using this control opportunity, at t=20 s, the load inductance is manually increased to its maximum value to provide an ultimate current damping feature. Then, the load is physically unplugged. A reverse procedure is followed at t=35 s to plug the load, $Z_4$, back in. This soft load change procedure, besides the damping effect of the power measurement filters, explains why the supplied powers in FIGS. 8E and 8F and the load demands in FIGS. 8G and 8H show slow and gradual profile rather than sudden changes.

Communication Delay and Channel Bandwidth

Communication is indispensable to access neighbor information 203 and, thus, to the operation of distributed electrical power networks 100. Accordingly, channel non-idealities, e.g., transmission/propagation delay and limited bandwidth, and channel deficiencies such as, for example, packet loss may compromise the overall system performance. Thus, low delay and high bandwidth communication protocols are of paramount value for distributed control structures. For example, WiFi and Ultra Wide Band (UWB) protocols offer bandwidths up to 5 GHz and 7.5 GHz, respectively, with delays less than 1 µs. It should be noted that the length of the communication link 107 directly affects the channel delay. Channel non-ideality effects have a negligible impact on the overall system performance if the channel delay is negligible compared to the controller dynamics. According to various embodiments of the present disclosure, the system dynamics of the electrical power network 100 exhibit different time constants for the voltage, active, and reactive power regulation. Therefore, the controller 209 can operate safely with most of the existing communication protocols.

Plug-and-Play Study

Figure 9:
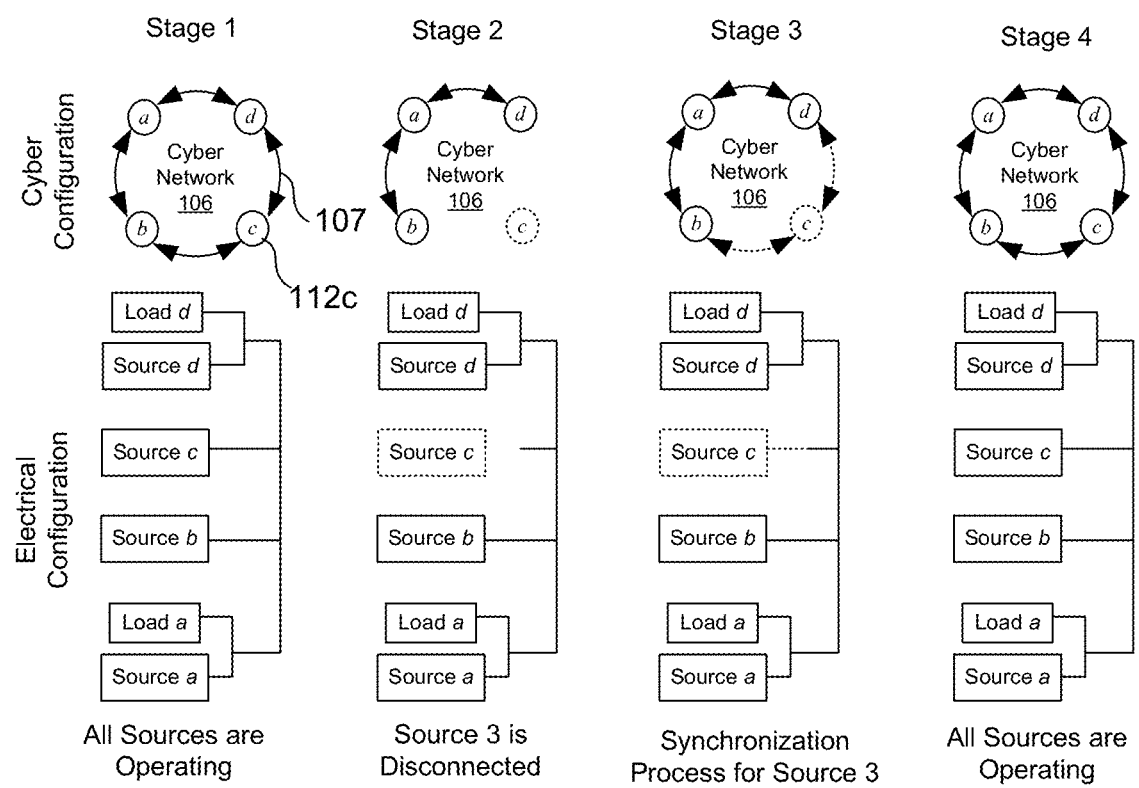
FIG. 9 is a diagram of an example of the electrical power network of FIG. 1A illustrating plug-and-play capabilities according to various embodiments of the present disclosure.

Turning now to FIG. 9, shown is an example of a schematic drawing illustrating the plug- and play capability of the electrical power network 100 according to various embodiments of the present disclosure. In stage 2, assume that the inverter 212 (FIG. 2) of Node c 112 has been unplugged. Assuming this inverter 212 is turned off instantly, the power measurements can exponentially decay to zero because of the existing low-pass filters.

It should be noted that a source failure also implies loss of all communication links 115 connected to that particular node 112. Accordingly, when Node c 212c fails, it automatically renders the links b-c (between Nodes b and c) and c-d inoperable. However, as seen in FIG. 9, the remaining links 115 still form a connected graph with balanced Laplacian matrix and, thus, the control methodology should remain functional. In an experiment performed, the controllers 209 successfully respond to the inverter loss and share the excess power among the remaining inverters 212 in proportion to their power ratings. After the loss of the inverter 212 of Node c 212c, the voltage measurement for bus c may be unavailable. Thus, the controllers 209 collectively regulate the new average voltage, i.e., the average voltage of the remaining three inverters 212, at the rated value of 120 V. However, in some embodiments, bus c can experience voltage sag due to the loss of generation. It should be noted that although the inventor 212 of Node c is disconnected from bus c the bus voltage is still available. In the experiment, the inverter 212 of Node c is plugged back in and the controller 209 of Node c 112c is activated. In some embodiments, the synchronization procedure can delay inverter engagement. After successful synchronization, the controller 209 is activated and performs successfully in the global voltage regulation and readjusting the load sharing to account for the latest plugged-in inverter.

Failure Resiliency in Cyber Domain

The original communication network 106 is designed to carry a minimum redundancy, such that no single communication link 115 failure can compromise the connectivity of the communication network 106. When a communication link 115 is disabled, there is no impact on the voltage regulation or load sharing, and the communication network 106 is still connected with a balanced Laplacian matrix. In some embodiments, the receiving-end controller 209 updates its set of neighbor nodes 112 by ruling out the node 112 on the transmitting end of the failed communication link 115. This reconfiguration ensures that the misleading zero-valued data associated to the failed link (e.g., zero active and reactive power measurements) will not be processed by the receiving-end controller 209 and, thus, the electrical power network 100 remains functional.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the devices are not intended to be limited to the particular forms disclosed. Rather, they include all modifications and alternatives falling within the scope of the claims, and embodiments other than the one shown may include some or all of the features of the depicted embodiment. For example, components may be omitted or combined as a unitary structure, and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

Therefore, at least the following is claimed:

1. An electrical power network comprising:
  a plurality of source nodes coupled to a respective distribution line of a distribution network, where each source node of the plurality of source nodes comprises a respective power source and a respective local controller configured to operate in islanded mode and grid-connected mode of the electrical power network, and the electrical power network does not include a centralized controller and is configured to share load among the plurality of source nodes; and a communication network configured to facilitate an exchange of information between a respective source node and a respective predefined subset of the plurality of source nodes, the respective predefined subset of the plurality of source nodes comprising one or more neighbor source nodes of the respective source node, where the information includes a normalized reactive power of the one or more neighbor source nodes and a normalized active power of the one or more neighbor source nodes, and the communication network is defined such that the communication network remains connected with a failure of at least one of: (1) a specific source node of the plurality of source nodes and respective communication links of the specific source node or (2) a communication link without a failure of any source node the communication link is connecting;

where for each source node, the respective local controller comprises a voltage regulator regulating both voltage phase and voltage magnitude, a reactive power regulator, and an active power regulator, where:

the voltage regulator is configured to collectively at least regulate an average voltage across the entire electrical power network at a reference ($e_{rated}$) value, the average voltage based on a local measured voltage and a respective neighbor measured voltage of the one or more neighbor source nodes, the reactive power regulator is configured to collectively at least adjust individual voltages of the electrical power network to achieve proportional reactive load sharing among the plurality of source nodes based at least in part on a comparison of the normalized reactive power of the one or more neighbor source nodes with a local normalized reactive power of the respective source node, the reactive load sharing being in proportion to a respective rated power of each of the plurality of source nodes, and the active power regulator is configured to collectively at least:

determine a local normalized active power of the respective source node; and regulate at least a frequency of the respective source node based at least in part on a comparison of the local normalized active power with the normalized active power of the one or more neighbor source nodes, active load sharing being in proportion to the respective rated power of each of the plurality of source nodes; and where the respective local controller is configured to respond to an effect of a respective distribution line impedance based at least in part on the average voltage of the electrical power network where a first voltage of a first source node of the plurality of source nodes differs from a second voltage of a second source node of the plurality of source nodes, and the respective distribution line impedance is non-negligible due to at least the first voltage being different from the second voltage.

2. The electrical power network of claim 1, wherein the respective power source is a dispatchable source.

3. The electrical power network of claim 1, wherein the respective power source is a non-dispatchable source.

4. The electrical power network of claim 1, wherein the respective source node further comprises an inverter, the respective power source being coupled to the inverter.

5. The electrical power network of claim 1, wherein the distribution network comprises at least one of an inductive network, an inductive-resistive network, or a resistive network.

6. The electrical power network of claim 1, wherein the information being exchanged comprises a voltage, the normalized reactive power according to one or more source ratings, and the normalized active power according to one or more source ratings.

7. The electrical power network of claim 1, wherein the respective local controller of the respective source node is configured to:

determine local information of the respective source node; and simultaneously update a voltage magnitude and a phase angle of the respective source node based at least in part on the local information and the information received from the one or more neighbor source nodes of the respective source node.

8. The electrical power network of claim 1, wherein the electrical power network comprises a first power grid and another electrical power network comprises a second power grid, and further comprising a tertiary control unit, wherein the electrical power network is coupled to the other electrical power network via one or more transmission lines, and the tertiary control unit being configured to control power flow between the first power grid and the second power grid.

9. The electrical power network of claim 1, wherein at least one of the one or more neighbor source nodes is not adjacent to the respective source node.

10. The electric power network of claim 1, wherein the one or more neighbor source nodes are randomly selected.

11. The electric power network of claim 1, wherein the communication network corresponds to a sparse communication graph with at least a spanning tree, a balanced Laplacian matrix, and a minimum communication redundancy where the communication network is connected and remains connected with a failure of a single source node or a communication link.

12. An electrical power network, comprising:

a physical layer comprising a plurality of source nodes coupled to a distribution network via a plurality of respective distribution lines, individual ones of the plurality of source nodes comprising a power source and a local controller comprising a voltage regulator, a reactive power regulator, and an active power regulator, the electrical power network not including a centralized controller and configured to share load among the plurality of source nodes, the local controller for the individual ones of the plurality of source nodes being configured to respond to an effect of a distribution line impedance of the plurality of respective distribution lines based at least in part on an average voltage across the electrical power network where a first voltage of a first source node differs from a second voltage of a second source node, and the distribution line impedance of the plurality of respective distribution lines of the distribution network being non-negligible based at least in part on different voltages among the plurality of source nodes; and a communication layer comprising a communication network of the plurality of source nodes grouped into a plurality of source node subsets for communicating power information, individual ones of the plurality of source node subsets comprising a respective source node and one or more predefined neighbor source nodes of the respective source node, the respective source node being connected to the one or more predefined neighbor source nodes via a respective communication link, wherein the power information includes a normalized reactive power of the one or more predefined neighbor source nodes and a normalized active power of the one or more predefined neighbor source nodes, and the communication network is defined such that the communication network remains connected with a failure of at least one of: (1) a specific source node of the plurality of source nodes and respective communication links of the specific source node or (2) a communication link without a failure of any source node the communication link is connecting;

where for the individual ones of the plurality of source nodes:

the voltage regulator is configured to collectively at least regulate the average voltage across the entire electrical power network at a reference ($e_{rated}$) value, the average voltage based at least in part on a local measured voltage and a respective neighbor measured voltage of the one or more predefined neighbor source nodes;

the reactive power regulator is configured to collectively at least adjust individual voltages of the electrical power network to achieve proportional reactive load sharing among the plurality of source nodes based at least in part on a comparison of the normalized reactive power of the one or more predefined neighbor source nodes with a local normalized reactive power of the respective source node, the reactive load sharing being in proportion to a respective rated power of each of the plurality of source nodes; and the active power regulator is configured to collectively at least:
determine a local normalized active power of the respective source node, and
regulate at least a frequency of the respective source node based at least in part on a comparison of the local normalized active power with the normalized active power of the one or more predefined neighbor source nodes, active load sharing being in proportion to the respective rated power of each of the plurality of source nodes.

13. The electrical power network of claim 12, wherein the respective communication link is a wireless connection.

14. The electrical power network of claim 12, wherein a remaining plurality of source nodes in the communication network remain connected upon failure of at least one of: a particular communication link or a particular source node.

15. The electrical power network of claim 12, wherein the local controller is configured to at least:
determine local reactive power, active power, and voltage information of the respective source node; and
update an estimation of the average voltage across the electrical power network, a voltage magnitude, and a phase angle of the respective source node based at least in part on (1) the local active and reactive power and an estimation of the average voltage calculated locally and (2) neighbor active and reactive power and an estimation of the average voltage calculated by and received from the one or more predefined neighbor source nodes.

16. The electrical power network of claim 12, wherein the distribution network comprises at least one of an inductive network, an inductive-resistive network, or a resistive network.

17. A method for managing load sharing on an electrical power network comprising a plurality of source nodes, the method comprising:

receiving, via a source node of the electrical power network, neighbor power and voltage information from a neighbor source node of a defined subset of the plurality of source nodes of the electrical power network, the neighbor power and voltage information including a normalized reactive power and a normalized active power of the neighbor source node, the electrical power network configured to share load among the plurality of source nodes, where the electric power network does not include a centralized controller, the source node comprising a power source and a local controller comprising a voltage regulator, a reactive power regulator, and an active power regulator, the source node being designated to communicate with the neighbor source node via a predefined communication network configured to facilitate exchange of the neighbor power and voltage information between the source node and the defined subset of the plurality of source nodes, the predefined communication network being defined such that in response to a failure of a specific source node in the electrical power network, the predefined communication network remains uncompromised and voltage regulation and proportional load sharing in the electrical power network is not impacted, the local controller being configured to respond to an effect of a distribution line impedance that is non-negligible based at least in part on an average voltage of the electrical power network where a first voltage of the source node differs from a second voltage of the neighbor source node, the distribution line impedance being non-negligible due in part to the first voltage being different from the second voltage;

determining, via the source node, local active and reactive power information of the source node, the local active and reactive power information comprising a local normalized reactive power and a local normalized active power; and updating, via the source node, an estimation of the average voltage across the electrical power network, a voltage magnitude, and a phase angle of the power source of the source node based at least in part on the local active and reactive power information of the source node and neighbor active and reactive power information, where:

the voltage regulator is configured to collectively at least regulate the average voltage across the entire electrical power network at a reference ($e_{rated}$) value, the average voltage based at least in part on a local measured voltage of the source node and a neighbor measured voltage of the neighbor source node;

the reactive power regulator is configured to collectively at least adjust individual voltages of the electrical power network to achieve proportional reactive load sharing among the plurality of source nodes based at least in part on a comparison of the normalized reactive power of the neighbor source node with the local normalized reactive power of the source node, the reactive load sharing being in proportion to a respective rated power of each of the plurality of source nodes; and the active power regulator is configured to collectively at least regulate at least a frequency of the source node based at least in part on a comparison of the local normalized active power with the normalized active power of the neighbor source node, active load sharing being in proportion to the respective rated power of each of the plurality of source nodes.

18. The method of claim 17, wherein the source node comprises a plurality of source nodes of the electrical power network, individual ones of the plurality of source nodes are designated to communicate with a predefined subset of at least one neighbor node of the plurality of source nodes.

19. The method of claim 17, wherein the power source is a dispatchable source or a non-dispatchable source.

20. The method of claim 17, wherein the source node further comprises an inverter, the power source being coupled to the inverter.

* * * * *